United States Patent
Blais-Morin

(10) Patent No.: US 8,385,687 B1
(45) Date of Patent: Feb. 26, 2013

(54) METHODS FOR DETERMINING A TRANSFORMATION BETWEEN IMAGES

(75) Inventor: Louis-Antoine Blais-Morin, Montréal (CA)

(73) Assignee: Matrox Electronic Systems, Ltd., Dorval (CA)

( * ) Notice: Subject to any disclaimer, the term of this patent is extended or adjusted under 35 U.S.C. 154(b) by 938 days.

(21) Appl. No.: 11/567,727

(22) Filed: Dec. 6, 2006

(51) Int. Cl.
*G06K 9/32* (2006.01)

(52) U.S. Cl. .................. 382/294; 382/293; 382/295

(58) Field of Classification Search .......... 382/293–295
See application file for complete search history.

(56) References Cited

U.S. PATENT DOCUMENTS

| | | | |
|---|---|---|---|
| 6,249,616 B1 * | 6/2001 | Hashimoto | 382/284 |
| 6,611,615 B1 * | 8/2003 | Christensen | 382/130 |
| 7,778,490 B2 * | 8/2010 | Quist | 382/294 |
| 2002/0141626 A1 * | 10/2002 | Caspi | 382/131 |
| 2005/0094898 A1 * | 5/2005 | Xu et al. | 382/294 |
| 2006/0034500 A1 * | 2/2006 | Quist et al. | 382/130 |
| 2006/0034545 A1 * | 2/2006 | Mattes et al. | 382/294 |
| 2006/0133694 A1 * | 6/2006 | Dewaele | 382/294 |
| 2007/0086678 A1 * | 4/2007 | Chefd'hotel et al. | 382/294 |
| 2008/0310760 A1 * | 12/2008 | Carlsen et al. | 382/294 |

OTHER PUBLICATIONS

Jager et al., "A New Method for MRI Intensity Standardization with Application to Lesion Detection in the Brain", Vision, Modeling, and Visualization 2006: proceedings, Nov. 22-24, 2006, pp. 269-276.*
Candocia, Frank M., "Simultaneous Homographic and Comparametric Alignment of Multiple Exposure-Adjusted Pictures of the Same Scene", IEEE Transactions on Image Processing, vol. 12, No. 12, Dec. 2003 pp. 1485-1494.
Flusser, et al., "A Moment-Based Approach to Registration of Images with Affine Geometric Distortion", IEEE Transactions on Geoscience and Remote Sensing, vol. 32, No. 2, Mar. 1994, pp. 382-387.
Lehmann, Thomas M., "A Two-Stage Algorithm for Model-Based Registration for Medical Images", Proceedings of the 14th International Conference on Pattern Recognition ICPR'98, Brisbane, Australia, 1998.
Mann, S. et al., "Video Orbits of the Projective Group: A Simple Approach to Featureless Estimation of Parameters", IEEE Transactions on Image Processing, vol. 6. No. 9, Sep. 1997, pp. 1281-1295.
Shum, et al., "Panoramic Image Mosaics", Microsoft Research, Technical Report MSR-TR-97-23, Sep. 1997, pp. 1-53.
Zitova et al., "Image Registration Methods: A Survey", Image and Vision Computing 21 (2003) pp. 977-1000.

* cited by examiner

*Primary Examiner* — Anand Bhatnagar
*Assistant Examiner* — Soo Park
(74) *Attorney, Agent, or Firm* — Rhodes Donahoe, P.C.

(57) ABSTRACT

In accordance with one embodiment, a method of determining a transformation between a first image and a second image includes acts of, for at least one region in the first image, determining a corresponding region in the second image as a function of a transformation parameter and determining a similarity function as a function of the transformation parameter between the region in the first image and the corresponding region in the second image. In one embodiment, the method further includes acts of determining a similarity function between the first image and the second image using the similarity function for the at least one region, and determining a value of the transformation parameter, wherein the value substantially optimizes the similarity function between the first image and the second image.

24 Claims, 20 Drawing Sheets

METHODS FOR DETERMINING A TRANSFORMATION BETWEEN IMAGES

BACKGROUND OF INVENTION

1. Field of Invention

Embodiments of the invention relate generally to image transformations. More specifically, at least one embodiment relates to methods for determining a transformation that aligns two images.

2. Discussion of Related Art

Image alignment or registration is employed in a wide variety of fields including cartography, medical imaging systems and machine vision systems to name a few. In general, proper alignment is achieved by identifying a transformation of an image relative to the image with which it is being aligned. Image alignment or registration may be used in various applications. For example, two images of the same subject may be "overlaid" on one another once they are aligned. In addition, adjacent images of a common subject may be aligned to generate a large image from a plurality of adjacent images. Further, image alignment may be employed to determine a change in position of the subject of the image or the camera that is generating the images.

Image registration may be used to evaluate a first image when compared with a second image of the same subject or to generate a "fused" image that combines features from a plurality of images. In cartography multiple images may be combined to create a fused image that combines features of images that are properly aligned, for example, a satellite image may be overlaid with an image of a topographic map. In medicine, information from a first imaging system (an MRI system) may be combined with information from a second imaging system (a computer tomography system) to assist in better monitoring a patient's condition.

In a further medical imaging example, processes may also employ image registration to align two images which are acquired as follows: a first image acquired before injection of a colored liquid; and a second acquired after injection of the liquid. A subtraction operation is then performed on the images to highlight colored features (e.g., veins). Image registration is employed prior to the subtraction operation to account for movement of the subject.

Image registration may also be used with an "image stitching" or "image mosaicing" operation in which multiple images of a scene are taken from various positions and/or angles. The images are registered and then combined to form a single larger and/or higher resolution image. For example, these processes may be employed to: in cartography, combine aerial photographs of land; to create a panoramic image; in astronomy, to create a large image of the sky; or to combine multiple smaller images adjacent one another to construct a large image.

Further uses of image registration processes include: camera calibration, in which camera distortion parameters (e.g., barrel or pin-cushion distortions) are estimated so that they may be compensated for; in "super-resolution," where a high resolution image of a scene is generated using multiple lower resolution images of the same subject which are precisely aligned; and to determine a position of a camera with respect to an object having a known position. The preceding are just some of the uses for an image registration process that aligns two or more images. The utility of image registration continues to expand with the continued increase in the capabilities of both image capture systems and systems used for image processing/analysis.

FIG. 1 provides an example of two images of the same subject matter, e.g., a group of objects, a triangle 11, a circle 12, a rectangle 13, and a square 14, that may be the subject of image registration. That is, FIG. 1 includes a first image 10 and a second image 20. Further, although the two images 10, 20 do not present the same alignment of the image relative to the objects there is a considerable amount of overlap between the images. For example, the circle 12 appears in its entirety in each of the first and second images 10, 20, while at least a portion of each of the triangle 11, the rectangle 13 and the square 14 appear in each image 10, 20.

FIG. 2 illustrates an example in which the first image 10 is geometrically transformed to map the first image 10 relative to the second image 20. That is, positions in the first image are transformed into positions in the second image 20 or vice versa. Such a transformation is often referred to as a warp operation and generally results in the coordinates of each position in the first image 10 being transformed by some amount to convert them to coordinates in the second image 20. Of course, the transformation may instead operate to transform the coordinates of each position in the second image to convert them to coordinates in the first image 10.

As illustrated in FIG. 2, there may be regions of the first image 15, 16, 17 and regions of the second image 21, 22, 23 that do not correspond to any region of the other image. Generally, positions in these "non-overlapping" regions are not mapped because of the lack of correspondence. That is, these regions generally do not provide information that is useful in transforming the positions in the first image 10 to corresponding positions in the second image because no such correspondence exists.

Image alignment can be performed on a first and a second image using a transformation process whereby a first image is "moved" through a variety of positions/changes in orientation relative to a second image. That is, at least one of the images undergoes a geometrical transformation, e.g., warping. The transformation process may vary the parameters ("transformation parameters") employed to move the first image through a variety of positions/orientations until a close (e.g., an identical match) or otherwise optimal alignment is achieved between the first image and the second image. A transformation can be represented using various parameters. For example, a transformation can be represented using parameters for each of a: translation in the x direction; translation in the y direction; rotation; scale change in the x direction; scale change in the y direction; perspective change in the x direction; perspective change in the y direction; and shearing.

Generally, a transformation is performed as a mathematical operation in which the coordinates in the first image are transformed into corresponding coordinates in the second image or vice versa. As explained below, transformation processes may operate on image coordinates represented in a vector format. FIG. 3 illustrates an approach in which coordinates in two images, image A and image B may be represented mathematically and associated with one another in a common coordinate system to facilitate a transformation of an image. Some images can be represented mathematically as a 2 dimensional function $I(x, y)$ or, in vector form, $I(x)$ defined over a domain D. The vector $x=(x\ y)^T$ represents a position in the image expressed relative to a coordinate system of the image. The coordinate system is sometimes referred to as the basis of the image. For a grayscale image, $I(x)$ represents the grayscale intensity at position x of the image. For a digital image, $I(x)$ is a discrete function defined for integer values of x and y. However, I(x) can be extended to a continuous function over the domain D by interpolation, e.g. bilinear interpolation.

In the case of two or more images that are not aligned, the images will have different domains and consequently a different set of coordinates. In FIG. 3, the first image A is defined over a first domain $D_A$ and a second image B is defined over a second domain $D_B$. (The domains $D_A$ and $D_B$ are represented by the shaded areas that appear in FIG. 4.) As illustrated in FIG. 3, the first image A is offset both horizontally and vertically relative to the second image B. Accordingly, a translation in both the x direction and the y direction is required to locate in the second image B the position corresponding to the position x1, y1 of the first image A. That is, the position x1, y1 may be expressed in a first coordinate system $B_A$ or a second coordinate system $B_B$. As illustrated here, the transformation may involve a shift of various of the translation parameters identified above (i.e., an x translation and a y translation in the example illustrated in FIG. 3).

Various prior art approaches have been proposed to find a transformation that aligns two images. Some of these approaches employ a process that includes a minimization algorithm to minimize the difference between the images to find the best alignment, that is, to determine the set of transformation parameters that most closely align the images. However, these prior art approaches employ the intensity level difference on a pixel by pixel basis across the entire image to determine how well the first and second image are aligned, that is, how closely the intensity levels of the images are matched. Because these approaches are not effective unless the user has a very good initial estimate of the transformation parameters, these approaches generally reduce the level of detail in the images (i.e., smooth the images) before being processed by the algorithm to allow the algorithm to converge to the correct solution. As a result, these approaches may eliminate details that would have been useful in properly aligning the images.

Other approaches evaluate the registration of images by evaluating regions within the images. These approaches attempt to minimize a distance between matched regions. As a result, proper alignment is determined based on the separation distance. However, these approaches fail to take into account characteristics of a match between regions. For example, these approaches do not address the quality of a region-match nor its strength as a first region is shifted in any one of a plurality of directions relative to a second region with which it is being matched.

Current approaches also fail to provide a method to reduce or minimize the quantity of regions that should be matched to provide an optimal alignment between images.

SUMMARY OF INVENTION

Embodiments of the invention provide a method for image processing that may optimize a transformation that aligns images by selecting a region in a first image and a region that corresponds to the selected region in a second image. In addition, embodiments of the invention provide a method of selecting regions for alignment according to mathematical characteristics of the score function calculated from a set of previously selected regions. Further embodiments may determine an alignment based on a score function calculated for a few matched pairs of corresponding regions to increase the accuracy of the alignment and eliminate the need to smooth the images.

In one aspect, the invention provides a method of determining a transformation between a first image and a second image. In one embodiment, the method includes acts of, for at least one region in the first image, determining a corresponding region in the second image as a function of a transformation parameter and determining a similarity function as a function of the transformation parameter between the region in the first image and the corresponding region in the second image. In one embodiment, the method further includes acts of determining a similarity function between the first image and the second image using the similarity function for the at least one region, and determining a value of the transformation parameter, wherein the value substantially optimizes the similarity function between the first image and the second image.

In a further aspect, the invention provides, in a computer system having a display, a method of determining a transformation between a first image and a second image where the method includes acts of, for at least one region in the first image, determining a corresponding region in the second image as a function of a transformation parameter and determining a similarity function as a function of the transformation parameter between the region in the first image and the corresponding region in the second image. In one embodiment, the method further includes acts of determining a similarity function between the first image and the second image using the similarity function for the at least one region, determining a value of the transformation parameter, wherein the value substantially optimizes the similarity function between the first image and the second image, and displaying to a user a result of a transformation of at least one of the first image and the second image according to the value of the transformation parameter.

In another aspect of the invention, a computer readable medium is encoded with a program for execution on a processor, the program, when executed on the processor performing a method of determining a transformation between a first image and a second image, the method comprising acts of, for at least one region in the first image, determining a corresponding region in the second image as a function of a transformation parameter and determining a similarity function as a function of the transformation parameter between the region in the first image and the corresponding region in the second image. In one embodiment, the method further includes acts of determining a similarity function between the first image and the second image using the similarity function for the at least one region, and determining a value of the transformation parameter, wherein the value substantially optimizes the similarity function between the first image and the second image.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
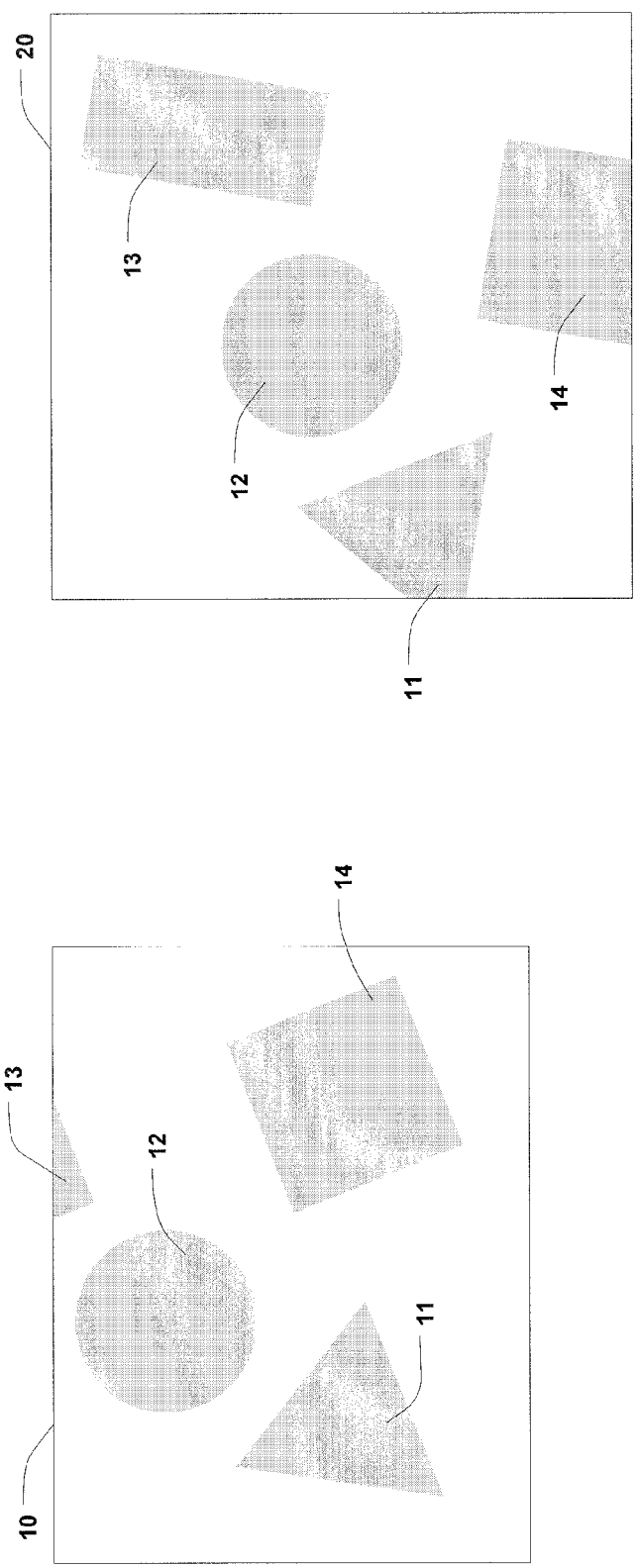
FIG. 1 illustrates two images that may be the subject of an alignment process.
Figure 2:
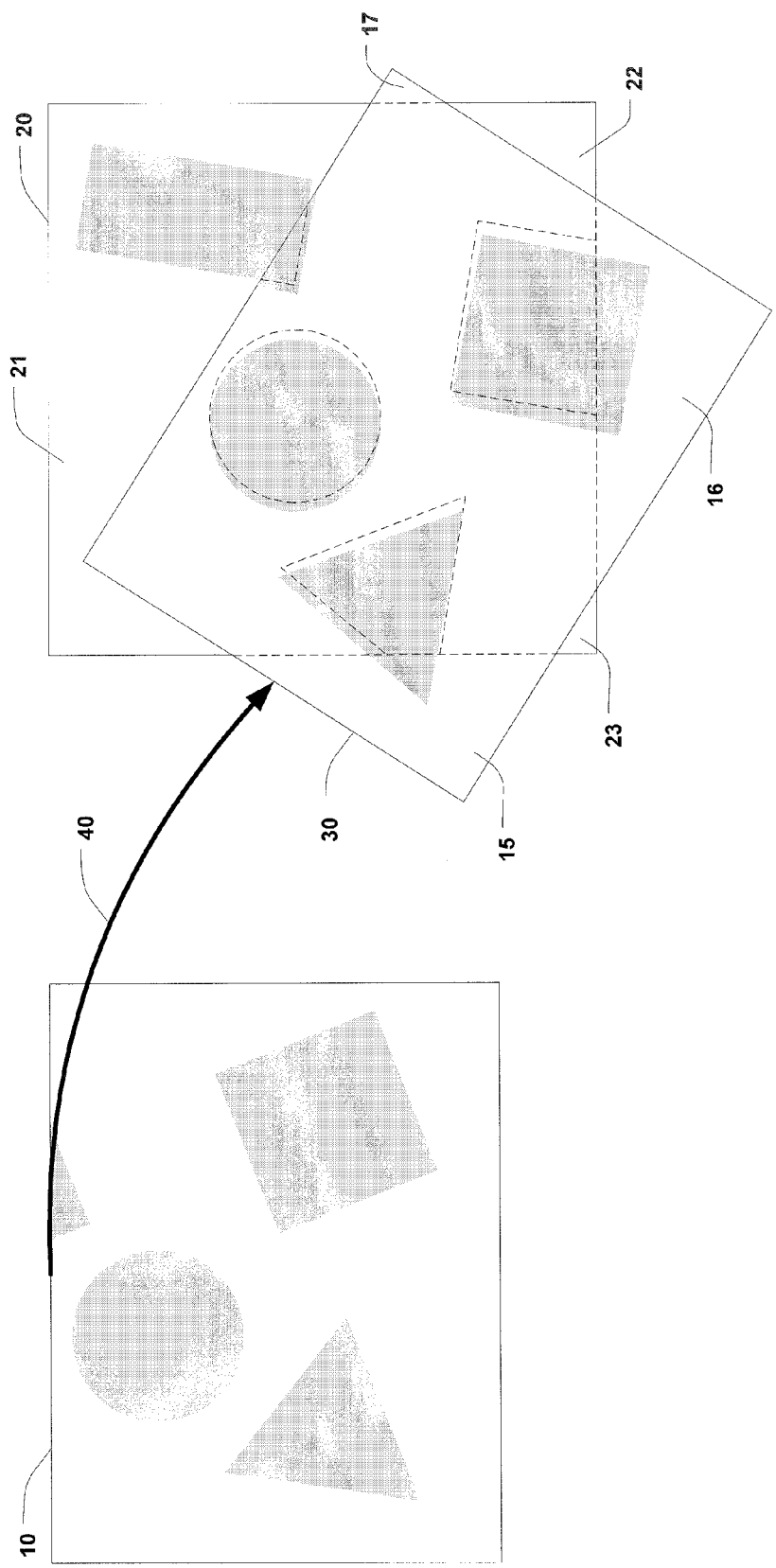
FIG. 2 illustrates a geometric transformation of a first image relative to a second image.
Figure 3:
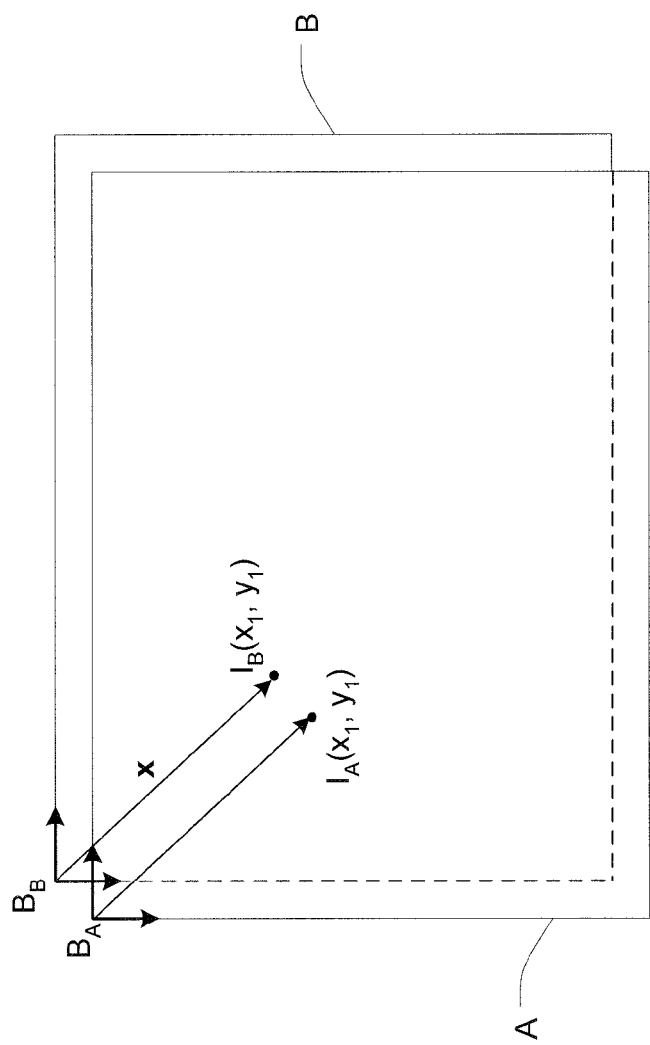
FIG. 3 illustrates domains in two different images.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Vectors referred to herein are represented in bold text.

As employed herein, in various embodiment, an "image" can be defined as a set of positional coordinates in a coordinate system in which each positional coordinate has one or more associated attributes. For example, an image can consist of a binary, monochrome, or color image, such as that acquired by a camera (e.g., acquiring visible, X-ray, infrared light, etc.) or by a radar or constructed synthetically. As described previously, in the case of a grayscale image, a positional coordinate has an associated grayscale intensity value I(x). In the case of a color image, a positional coordinate has several attributes representing, for example, the intensities of each of the colour bands (e.g. Red, Green, Blue) or the intensities of the luminance and chrominance components (e.g., YC). In this case, a positional coordinate has a vector-valued intensity I(x), e.g., I(x)=[R(x), G(x), B(x)].

Furthermore, an image can also be the result of applying any number of image processing steps to a prior image. For example, the image can be the result of an edge detection process. In this example, the "edge image" can include a set of positional coordinates corresponding to edge points, called "edge elements" or "edgels". The edge elements can include one or more attributes relating to the gradient of the edge element (e.g., intensity, angle and polarity), one or more attributes expressing a relationship between this edge element and adjacent edge points, etc.

Figure 4:
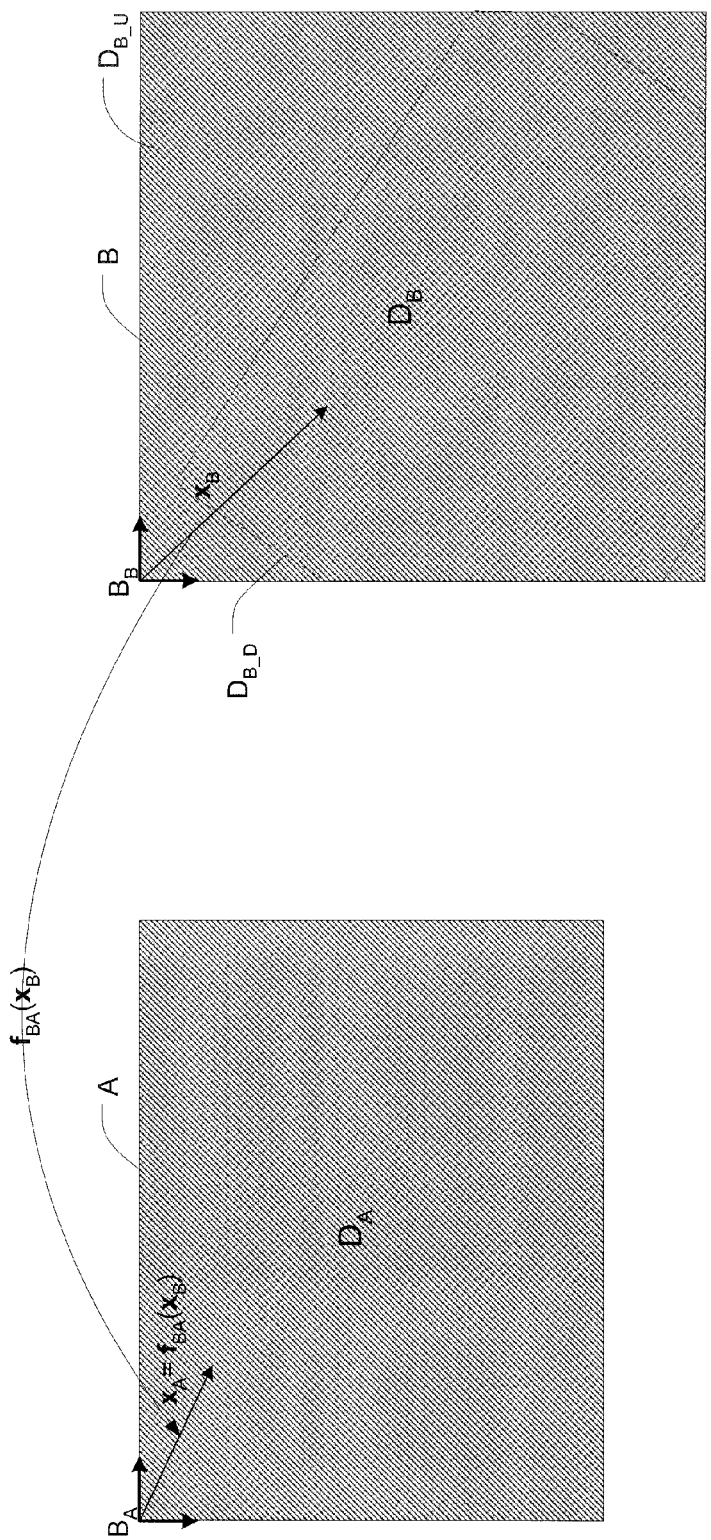
FIG. 4 illustrates a transformation of a first image to a domain of a second image in accordance with one embodiment of the invention.

Referring to FIG. 4, according to one embodiment, an image A (e.g., the image 10) is warped onto an image B (e.g., the image 20) via a transformation process. The resulting image (i.e., the "warped" or transformed image) is referred to as $I_{AonB}$ herein. In the illustrated embodiment, the image A may be mathematically represented as an image $I_A(x_A)$ defined over a domain $D_A$ and having a coordinate system $B_A$, and the image B may be mathematically represented as an image $I_B(x_B)$ defined over a domain $D_B$ and having a coordinate system $B_B$. The shading represents the fact that the domain $D_A$ encompasses the entirety of image A and the domain $D_B$ encompasses the entirety of image B.

According to one embodiment, the image $I_{AonB}$ can be obtained using a mapping function $x_A = f_{BA}(x_B)$. The function $f_{BA}$ includes a position $x_B$ in the coordinate system $B_B$ of image $I_B$ as a variable and returns a position $x_A$ in the coordinate system $B_A$ of image $I_A$ as a solution. The mapping function can be written in non-vector form as:

$$x_A = f_{xBA}(x_B, y_B) \qquad \text{Eq. 1}$$

$$y_A = f_{yBA}(x_B, y_B) \qquad \text{Eq. 2}$$

In a further embodiment, each position $x_B$ belonging to the domain $D_B$ of image $I_B$ is selected, in turn, to obtain the warped image $I_{AonB}$. The selected position $x_B$ is mapped to a position $x_A$ in the coordinate system $B_A$ of image $I_A$ using the mapping function $x_A = f_{BA}(x_B)$.

Figure 5:
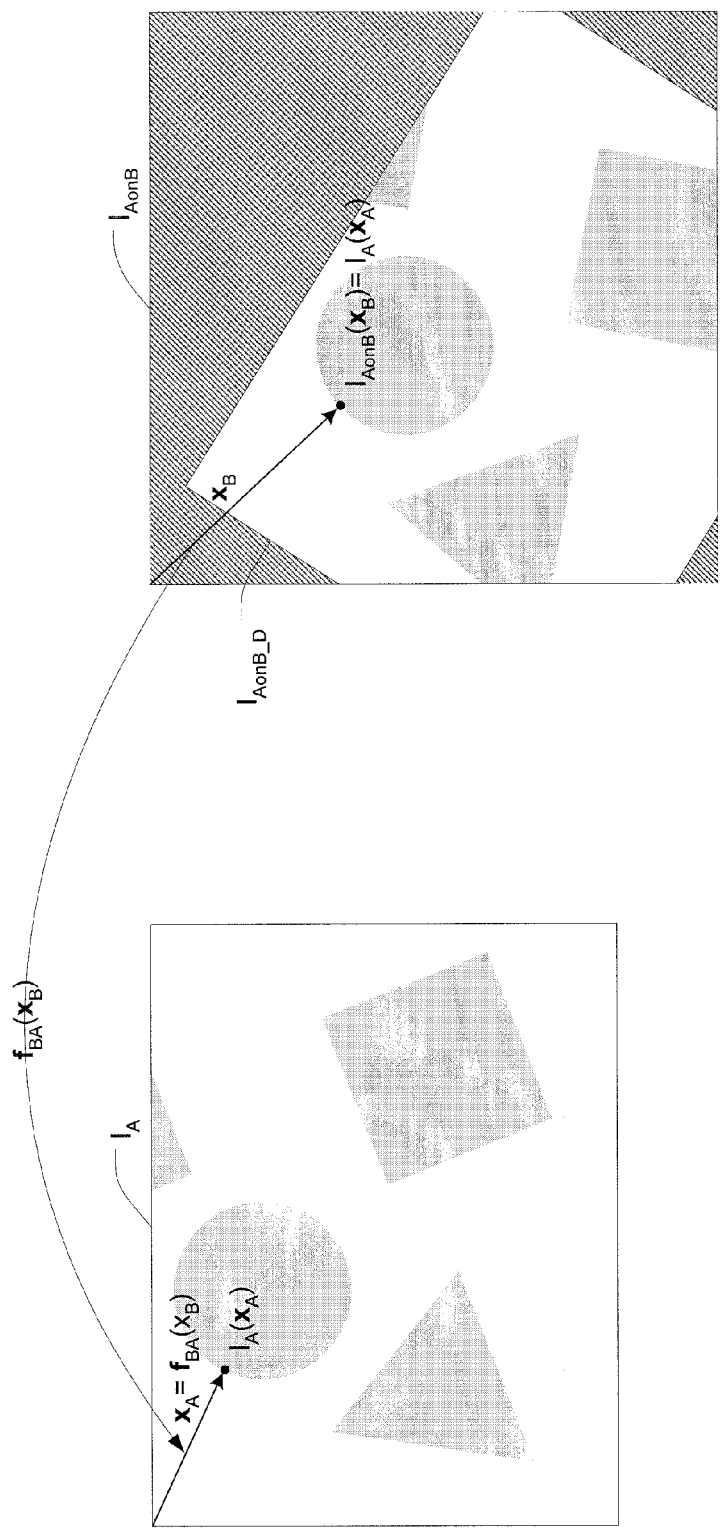
FIG. 5 illustrates a result of a transformation of a first image in accordance with one embodiment of the invention.

FIG. 5 pictorially illustrates the image $I_A$ mapped on the image $I_B$ in accordance with one embodiment. In one embodiment, if the mapped position $x_A$ belongs to the domain $D_A$ of image $I_A$, i.e., $I_A(x_A)$ is defined for $x_A$, then the value (e.g., the grayscale intensity) of the image $I_{AonB}$ at position $x_B$, $I_{AonB}(x_B)$, is set to the value of the image $I_A$ at the mapped position $x_A$, $I_A(x_A)$:

$$I_{AonB}(x_B) = I_A(x_A) = I_A(f_{BA}(x_B)) \qquad \text{Eq. 3}$$

If the mapped position $x_A$ falls outside the domain $D_A$ of image $I_A$, i.e., where $I_A(x_A)$ is undefined for $x_A$, then the value of the image $I_{AonB}$ at position $x_B$ is undefined. Referring again to FIG. 4, the domain $D_B$ of image $I_B$ can be partitioned into a sub-domain $D_{B\_D}$ for which image data $I_{AonB\_D}$ (illustrated in FIG. 5) is defined and a sub-domain $D_{B\_U}$ for which no image data is defined. That is, none of the locations in the image $I_A$ correspond to the locations in image $I_B$ found in the sub domain $D_{B\_U}$.

According to one embodiment, the geometric transformation (e.g., the warp operation) applied to the image $I_A$ to generate $I_{AonB}(x_B)$ can be written as a function of a vector of transformation parameters, $\alpha = (\alpha_0\, \alpha_1 \ldots \alpha_{N-1})^T$. For example, a translation can be written as a function of a transformation vector $\alpha = (\alpha_x\, \alpha_y)^T$, where $\alpha_x$ and $\alpha_y$ are the displacements in the x and y directions, respectively. In a further embodiment, a third parameter $\alpha_\theta$ can be employed to represent a rotation. According to one embodiment, a "full perspective transformation" employs a total of N=8 parameters. As mentioned above, these parameters may include: translation in the x direction; translation in the y direction, rotation; scale change in the x direction; scale change in the y direction; perspective change in the x direction; perspective change in the y direction; and shearing. In various embodiments, the transformation vector α need not include all of these parameters and may include any one alone, any combination of two or more of the preceding parameters or any combination of the preceding parameters and other parameters. Thus, the preceding list of parameters is not restrictive, and in other embodiments, the transformation parameters can include one or more parameters other than those listed here. The parameters that are employed may, in one embodiment, be determined based on the application with which the transformation process is employed.

According to one embodiment, the mapping function $x_A = f_{BA}(x_B)$ and the image $I_{AonB}(x_B)$ are functions of the transformation vector α, where:

$$x_A = f_{BA}(x_B, \alpha) \qquad \text{Eq. 4}$$

$$I_{AonB}(x_B, \alpha) = I_A(f_{BA}(x_B, \alpha)) \qquad \text{Eq. 5}$$

According to this embodiment, $I_{AonB}(\alpha)$ represents the image obtained by transforming the image $I_A$ onto the domain $D_B$ of the image $I_B$ according to a transformation vector α.

In accordance with another embodiment, a similarity measure G may be employed to determine the similarity between two images defined over a common domain. According to one embodiment, a similarity measure is used to determine how close in appearance two images are to one another. Embodiments of the invention may employ, for example, similarity measures that include a Normalized Grayscale Correlation (NGC) or other approaches that are known by those of skill in the art.

Figure 6:
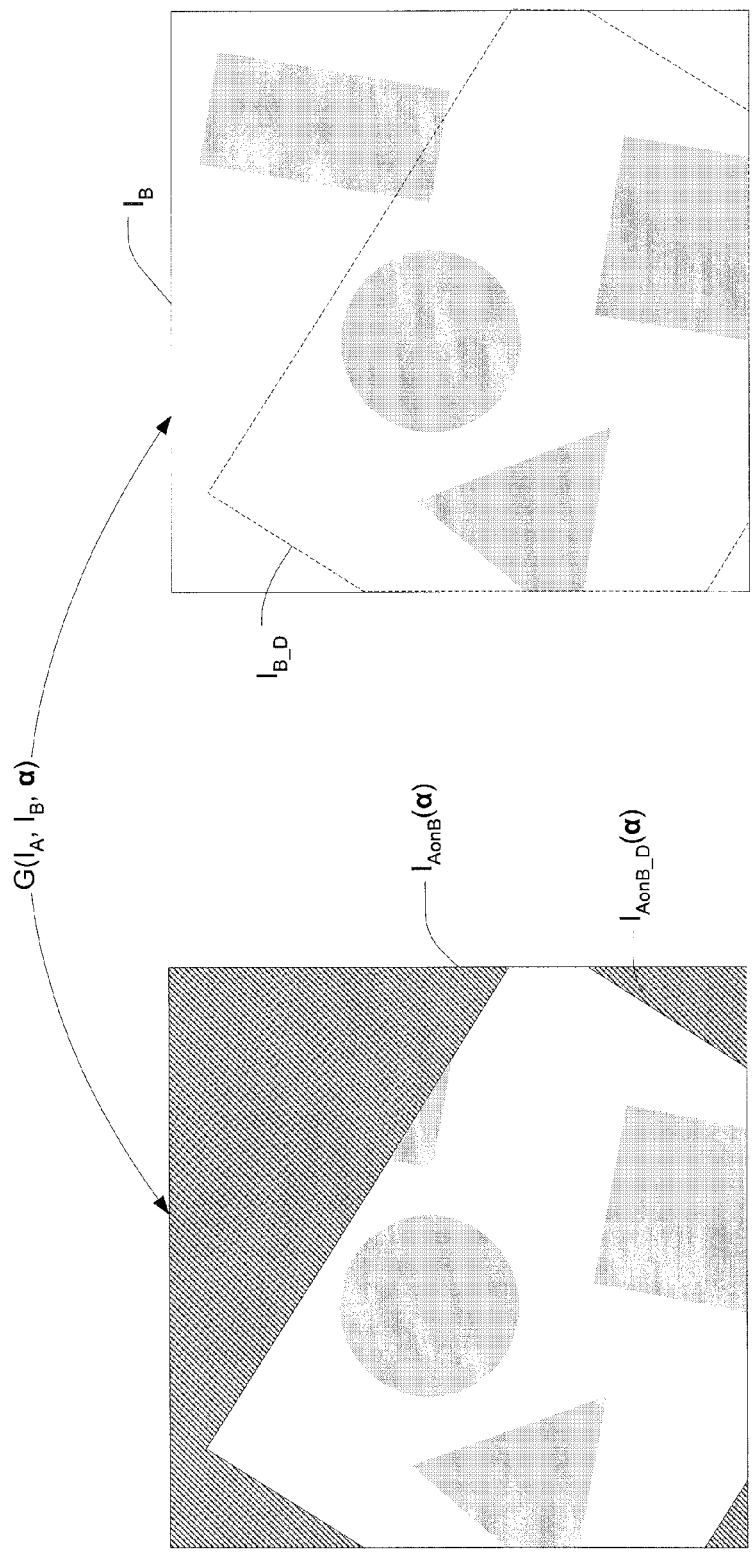
FIG. 6 illustrates a similarity measure in accordance with one embodiment of the invention.

FIG. 6, illustrates a similarity measure $G(I_{AonB}(\alpha), I_B)$ that determines the similarity between the image $I_B$ and the image $I_{AonB}(\alpha)$ in accordance with one embodiment. According to one embodiment, the similarity measure G is the result of the original images $I_A$, $I_B$, and the transformation vector α and is referred to as $G(I_A, I_B, \alpha)$. Referring again to FIG. 4, according to one embodiment, the similarity measure $G(I_A, I_B, \alpha)$ measures the similarity between the image $I_B$ and the image $I_{AonB}(\alpha)$ for the sub-domain $D_{B\_D}$ over which both images are defined.

In other words, in one embodiment, the similarity measure $G(I_A, I_B, \alpha)$ measures the similarity between the image portions $I_{AonB\_D}(\alpha)$ and $I_{B\_D}$ corresponding to the sub-domain $D_{B\_D}$. According to a further embodiment, the similarity measure $G(I_A, I_B, \alpha)$ does not address the sub domain $D_{B\_D}$ of the image $I_B$ because the image $I_A$ does not include any positions that correspond to that region of the image $I_B$.

As described above, in one embodiment, the similarity measure $G(I_A, I_B, \alpha)$ determines the similarity as a function of the transformation vector α. Accordingly, a change in one or more of the parameters included in the transformation vector α may result in a change of the value of the similarity measure $G(I_A, I_B, \alpha)$. In accordance with a further embodiment, a process determines a value $\alpha_{MAX}$ of the transformation vector $\alpha = (\alpha_0 \, \alpha_1 \, \ldots \, \alpha_{N-1})^T$ that maximizes the similarity measure $G(I_A, I_B, \alpha)$ measured between the image $I_B$ and the image $I_{AonB}(\alpha)$. In a version of this embodiment, the image $I_{AonB}(\alpha)$ is obtained by warping an image $I_A$ onto the domain $D_B$ of the image $I_B$ according to the transformation vector α. Accordingly, for given images $I_A$ and $I_B$, the similarity measure $G(I_A, I_B, \alpha)$ changes according to change in one or more of any of the parameters $\alpha_0, \alpha_1, \ldots \alpha_{N-1}$ in α. That is, the similarity measures varies when there is, for example, a change in the translation in the x direction, a change in translation in the y direction, a change in rotation, or any other changes that are described by the transformation vector α.

Figure 7:
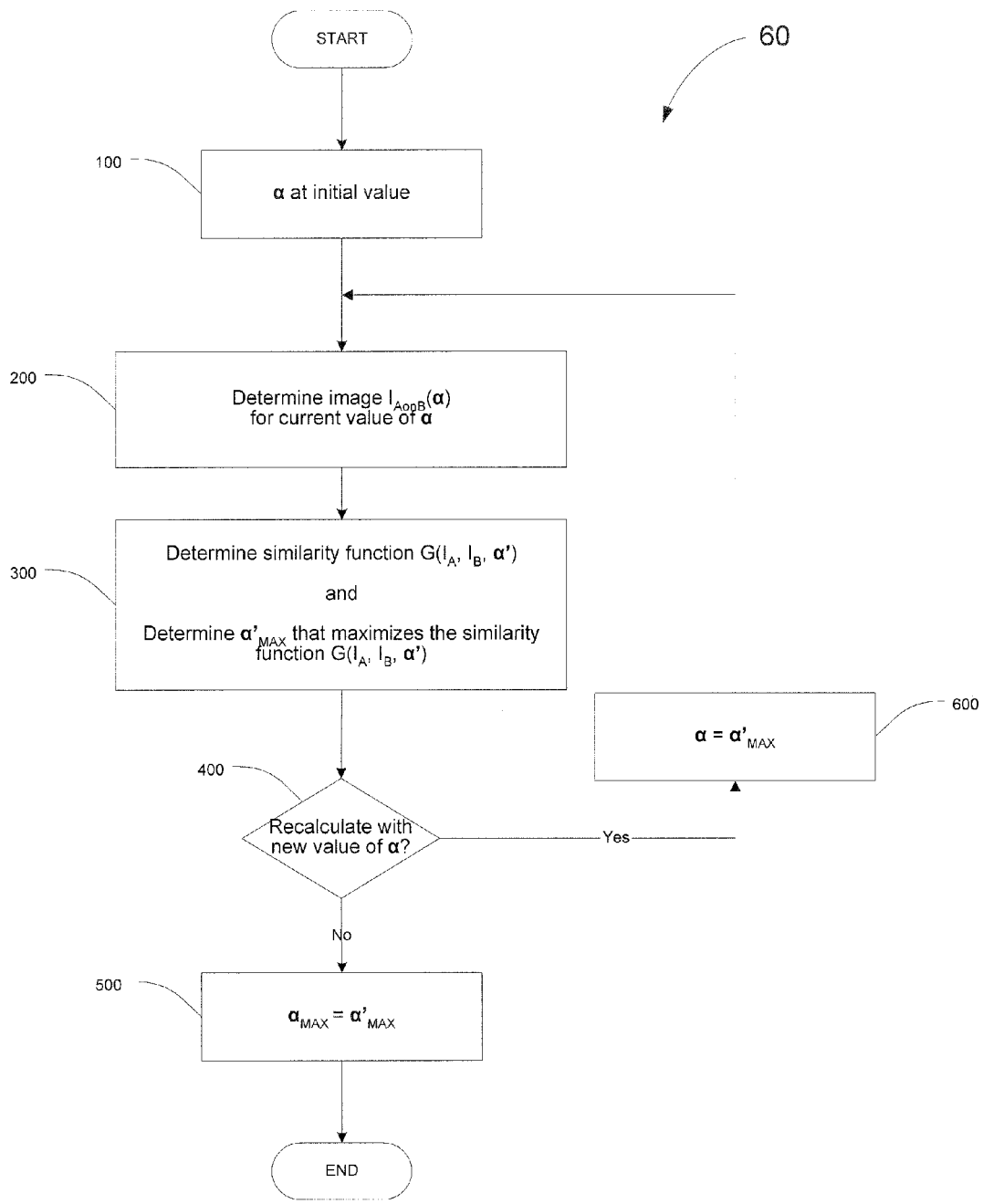
FIG. 7 illustrates a flow diagram in accordance with one embodiment of the invention.

FIG. 7 illustrates a process 60 for image registration in accordance with one embodiment. According to one embodiment, the registration process can employ an iterative approach to determine the value $\alpha_{MAX}$, e.g., the value of the transformation vector α that most closely aligns the images $I_B$ and $I_{AonB}$. However, an iterative approach is not included in some embodiments, in these embodiments, the acts 400 and 600 are not employed.

At act 100, the transformation vector α is initialized to an estimated value. According to one embodiment, the estimated value provides a starting point that allows the process to more rapidly converge to the value $\alpha_{MAX}$. The estimated value can be acquired in a number of ways, for example, it can be provided by the user, the value can be an output of a registration process that is less accurate than that provided by the process 60 (e.g., it can be the result of a "rough" registration process), or the value can be determined based on known positions of the cameras that acquired the images, etc. That is, according to one embodiment where a camera takes two photos of the subject the estimated value may be determined based on a known amount of panning of the camera between the acquisition of the first image and the acquisition of the second image. The panning may result in the two images being offset by a certain translation, rotation, etc.

At act 200, the image $I_{AonB}(\alpha)$ obtained by the mapping the image $I_A$ onto the domain $D_B$ of the image $I_B$ according to the current value of the transformation vector α is determined. Thus, for the first iteration (and possibly the only iteration), the image $I_{AonB}(\alpha)$ is determined using the estimated value. According to one embodiment, the image $I_{AonB}(\alpha)$ is determined by the previously-described mapping function. That is, $I_{AonB}(x_B, \alpha)$ is determined for each position $x_B$ in the domain $D_B$, as shown in Equation 5, above.

As mentioned above, the transformation vector α can include a plurality of transformation parameters, i.e., $\alpha = (\alpha_0, \alpha_1, \ldots \alpha_{N-1})^T$. These parameters may be represented as the parameters $\alpha_K$ where a change in a parameter is represented as $\Delta \alpha_K$. In various embodiments, the transformation vector should be considered as variable since it is changed to reach a better value $\alpha_{MAX}$. When it is considered as a variable, it is noted $\alpha' = (\alpha'_0, \alpha'_1, \ldots \alpha'_{N-1})^T$. The change between the variable $\alpha'$ and the current value of α is noted $\Delta \alpha = \alpha' - \alpha = (\Delta \alpha_0 \, \Delta \alpha_1 \, \ldots \, \Delta \alpha_{N-1})_T$.

According to one embodiment, at act 300, first, a similarity function, $G(I_A, I_B, \alpha')$, is determined. This function approximates, as a function of the transformation vector α', the similarity between the image $I_B$ and the warped image $I_{AonB}(\alpha')$, where the image $I_{AonB}(\alpha')$, is obtained by warping the image $I_A$ according to the changed transformation vector α'. In a further embodiment, the value $\alpha'_{MAX}$ of the transformation vector α' that maximizes the similarity function $G(I_A, I_B, \alpha')$ is determined. In some embodiments, act 300 may be replaced by a plurality of separate acts, for example, the act of determining the value $\alpha'_{MAX}$ may be included as a separate act.

As mentioned above, in some embodiments, the process 60 may include one or more iterations where each iteration generates the image $I_{AonB}(\alpha)$ for the current value of the transformation vector α. The determination of whether to repeat the acts 200 and 300 may be made by a user familiar with the overall process with which the process 60 is employed, e.g., the user may determine that the estimated value of the transformation vector α is suitable to allow the similarity function G to converge without iterating. Alternatively, an act 400 may be included in some embodiments to automatically determine whether further adjustment to the transformation vector α and corresponding repetition of acts 200 and 300 is desirable.

At act 400, it is determined whether acts 200 and 300 should be recalculated with a new value of the transformation vector α. According to one embodiment, at act 400, it is determined whether the transformation vector α has converged. One test of convergence is to check whether the modified transformation vector $\alpha'_{MAX}$ is closer to the current transformation vector α than a predefined threshold value, $\Delta\alpha_T$. In one embodiment, this threshold value can be determined by evaluating the changes in the transformation parameters that cause a displacement of the content of image $I_{AonB}$ (α) smaller than predefined distance expressed in pixels, for example less than one pixel. The user familiar with the overall process with which the process 60 is employed may determine the level of precision that is required when calculating the position of one image relative to the other.

According to one embodiment, if acts 200 and 300 are not to be repeated, the process moves to act 500 where the value $\alpha_{MAX}$ sought by the process 60 is set to the value of the transformation vector $\alpha'_{MAX}$ determined at act 300. In accordance with one embodiment, act 500 completes the process 60, e.g., the value of the transformation vector α that best aligns the subject images is known.

According to one embodiment, if acts 200 and 300 are to be repeated, at step 600, the transformation vector α is changed for the transformation vector $\alpha'_{MAX}$ determined at step 300, and the process 60 returns to step 200.

Figure 8:
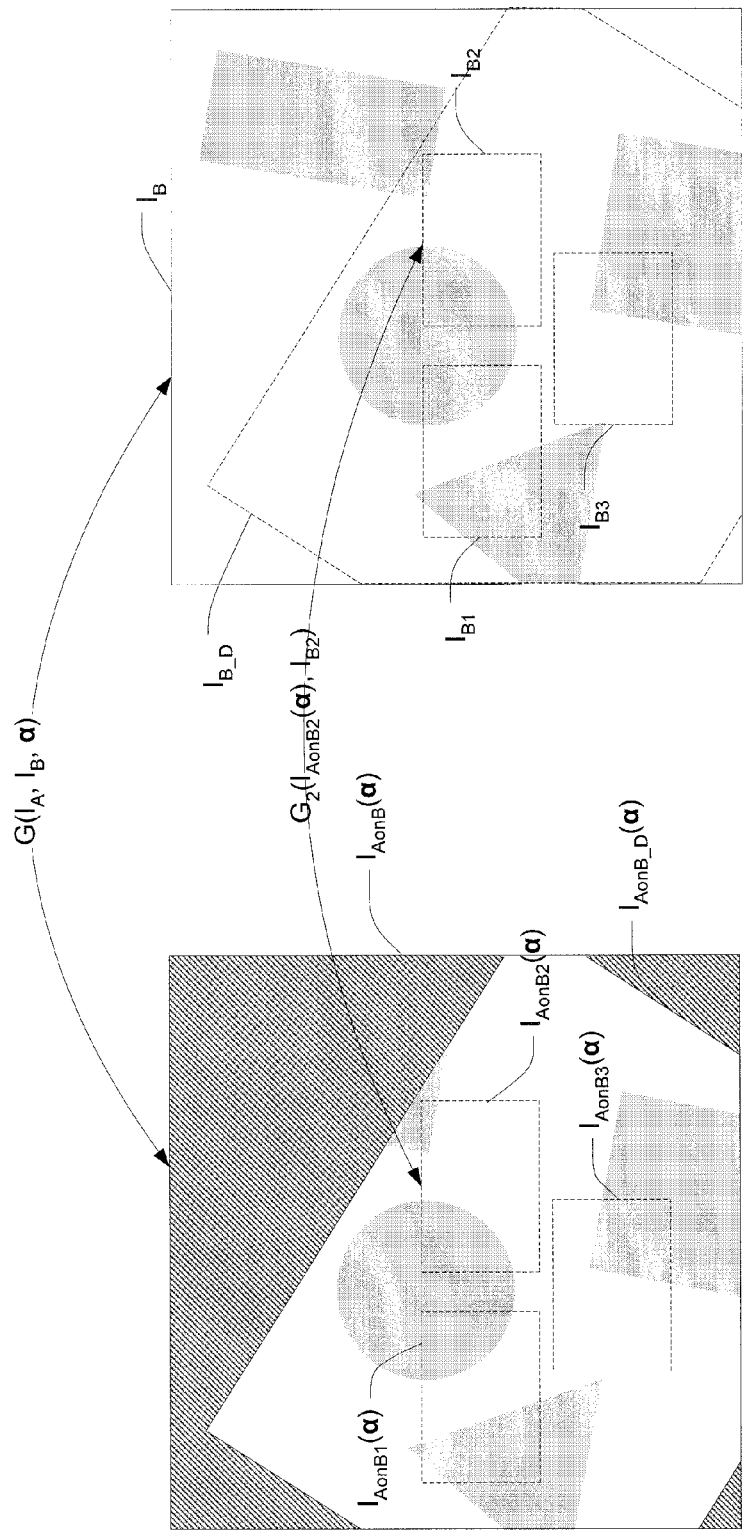
FIG. 8 illustrates a plurality of regions identified in two images according to an embodiment of the invention.
Figure 9:
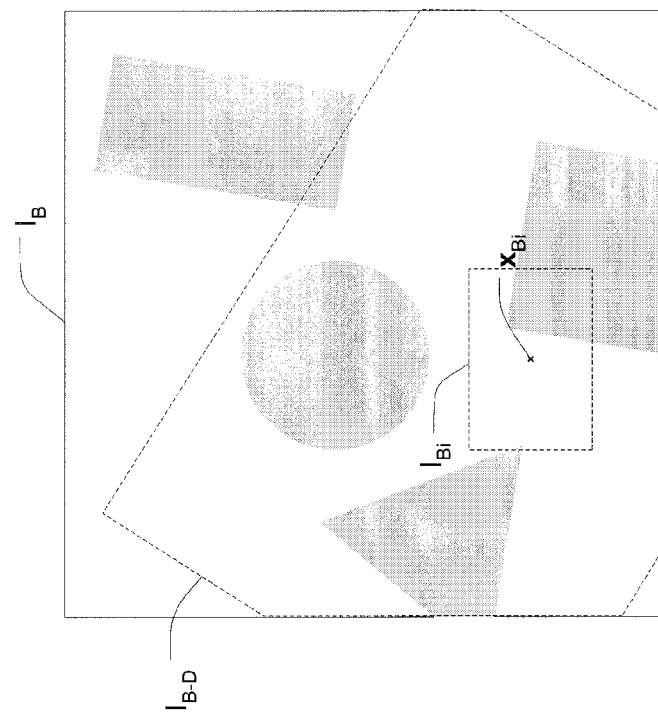
FIG. 9 illustrates a region in an image according to an embodiment of the invention.
Figure 9:
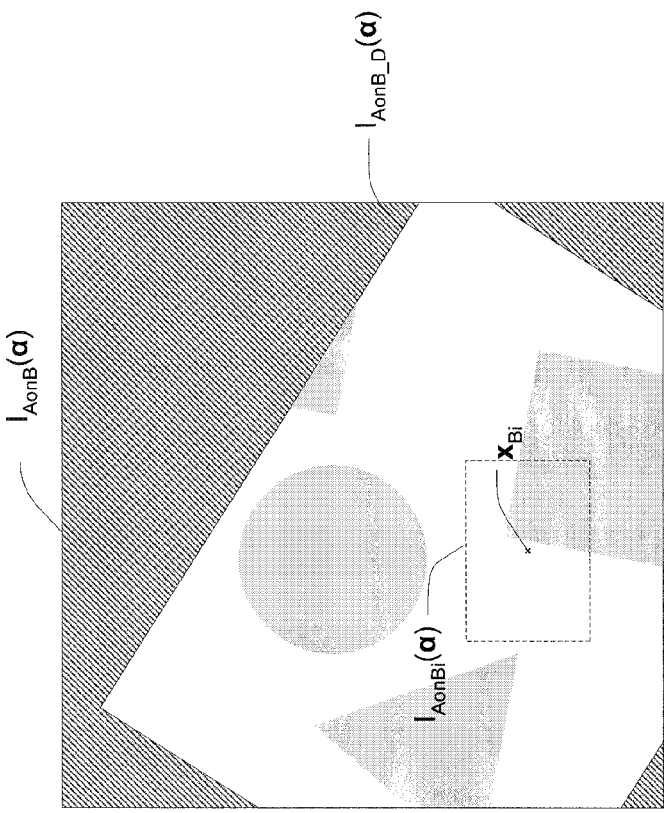

Various embodiments of the invention employ the transformation vector to determine a similarity measure on a region by region basis to determine the match between the image $I_B$ and the image $I_{AonB}(\alpha)$, that is, as the image A is transformed onto the domain $D_B$ with the transformation vector α. FIG. 8 illustrates a plurality of image regions $I_{B1}$, $I_{B2}$ and $I_{B3}$ and a plurality of corresponding image regions $I_{AonB1}$, $I_{AonB2}$, $I_{AonB3}$, respectively, mapped from the image $I_A$ to the image $I_B$. Further, in one embodiment, the central position in each region $R_i$ is identified as $x_i$ as illustrated in FIG. 9. For example, according to one embodiment, a similarity measure $G_i$ is determined for each of the regions $R_i$ based on the similarity between the images of the selected region, e.g., between the image region $I_{B1}$ and the image region $I_{AonB1}(\alpha)$. In a further embodiment, a similarity measure G determined for the image as a whole is determined from the individual similarity measures determined for the regions.

In accordance with one embodiment, for each region $R_i$, a similarity measure $G_i(I_{AonBi}(\alpha), I_{Bi})$ (e.g., a "local" similarity measure) is determined between the image portions $I_{AonBi}(\alpha)$ and $I_{Bi}$. Although at least three similarity measures (i.e., $G_1$, $G_2$, $G_3$) may be determined concerning the image regions illustrated in FIG. 8, for clarity, only the similarity measure $G_2$ ($I_{AonB2}(\alpha), I_{B2}$) between the image portions $I_{AonB2}$ (α) and $I_{B2}$ is shown.

In a further embodiment, the similarity measure $G(I_A, I_B, \alpha)$ (e.g., a "global" similarity measure) is determined by summing the similarities $G_i(I_{AonBi}(\alpha), I_{Bi})$ obtained for each of the regions $R_i$:

$$G(I_A, I_B, \alpha) = \sum_{i=1}^{N_R} G_i(I_{AonBi}(\alpha), I_{Bi}) \quad \text{Eq. 6}$$

where $N_R$ is the total number of regions $R_i$.

Figure 10:
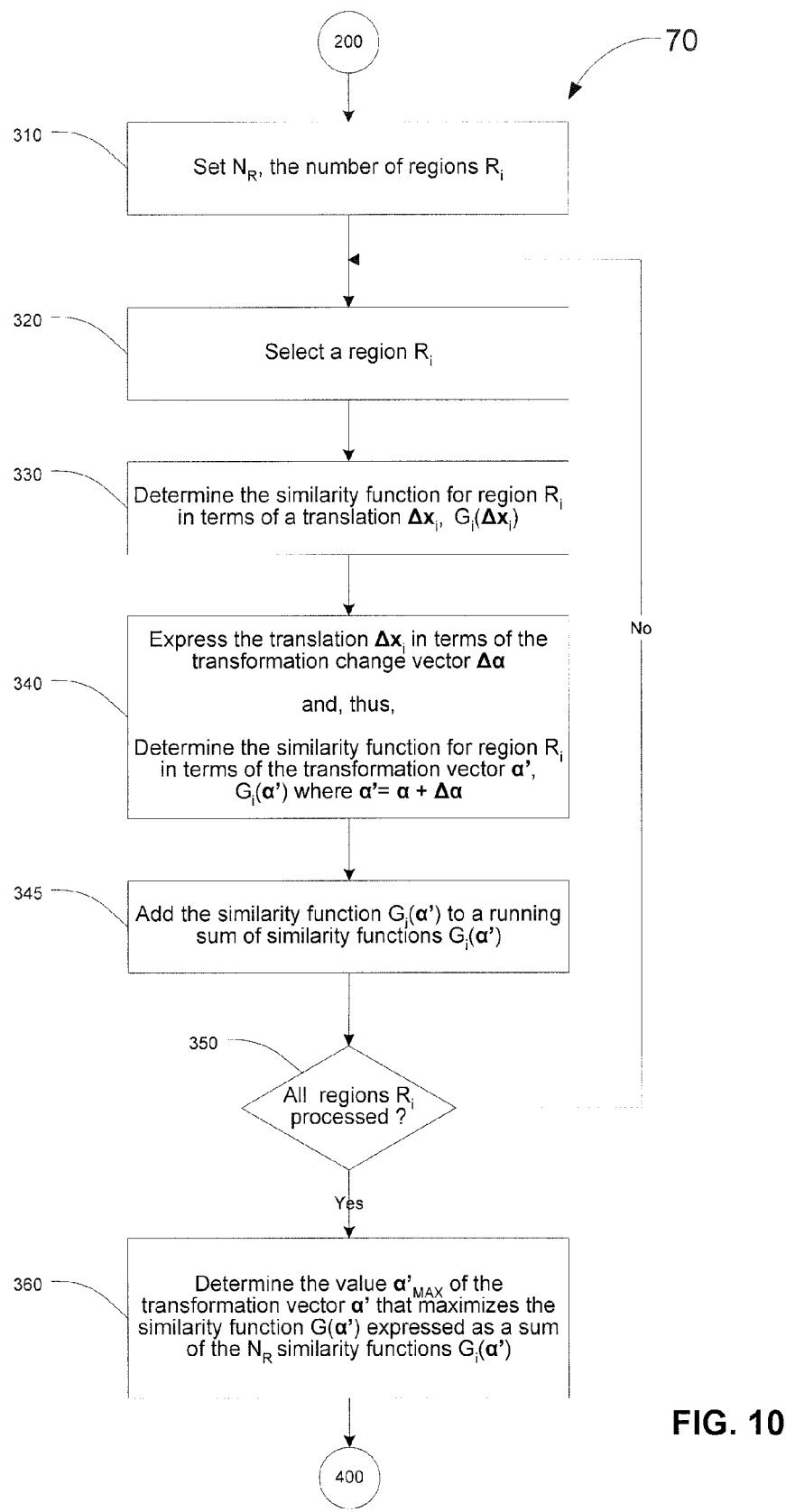
FIG. 10 illustrates a more detailed flow diagram of a portion of the process of FIG. 7 according to another embodiment of the invention.

FIG. 10 illustrates an embodiment of a process 70 that may be included in various embodiments of the act 300 which was described with reference to FIG. 7. As mentioned previously with reference to FIG. 7, at act 200, the image $I_{AonB}(\alpha)$ is determined for the current value of the transformation vector α. According to one embodiment, the image $I_{AonB}(\alpha)$ is initially determined for the estimated value of the transformation vector α. According to a further embodiment, the value of the transformation vector α may be further refined at each subsequent iteration of a loop including the acts 200 and 300.

According to one embodiment, at act 310, a quantity $N_R$ of regions $R_i$ is established. According to one embodiment, a fixed quantity, for example of 20 regions is established. In another embodiment, the quantity of regions is determined by calculating the quantity of regions that would cover a fixed fraction of the image domain. In still another embodiment, a fixed maximum quantity of regions is set, for example 20, but this total can be lowered in the further described step 321 if the calculation of the value of $\alpha'_{MAX}$ has less than a predefined amount of uncertainty.

At act 320, a rectangular region $R_i$ in the domain $D_B$ of image $I_B$ is selected in one embodiment, for example, the region $I_{B3}$ illustrated in FIG. 8. According to a further embodiment, the selected region is a region that appears within (e.g., entirely within) the sub-domain $D_{B-D}$ illustrated in FIG. 4. That is, the selected region includes positions located within the image $I_B$ and the image $I_{AonB}$. The portions of the image $I_{AonB}(\alpha)$ and of the image $I_B$ corresponding to the region $R_i$ are identified as $I_{AonBi}(\alpha)$ and $I_{Bi}$, respectively as illustrated in the embodiment shown in FIG. 9. Accordingly, the center of the rectangular region $R_i$, and therefore of the image portions $I_{AonBi}(\alpha)$ and $I_{Bi}$, is identified as $x_{Bi}$.

According to one embodiment, for each region $R_i$, the effect of the change $\Delta\alpha$ a of the transformation vector α' is approximated by a translation represented by a translation parameter $\Delta x_i$. That is, although the transformation vector α may include transformation parameters concerning rotation, scale, etc., the resulting "movement" of individual regions $I_{AonBi}(\alpha)$, for different values of the transformation vector α' may, in one embodiment, be approximated by purely translation movement. This approach may be referred to as "approximation by translation."

Figure 11:
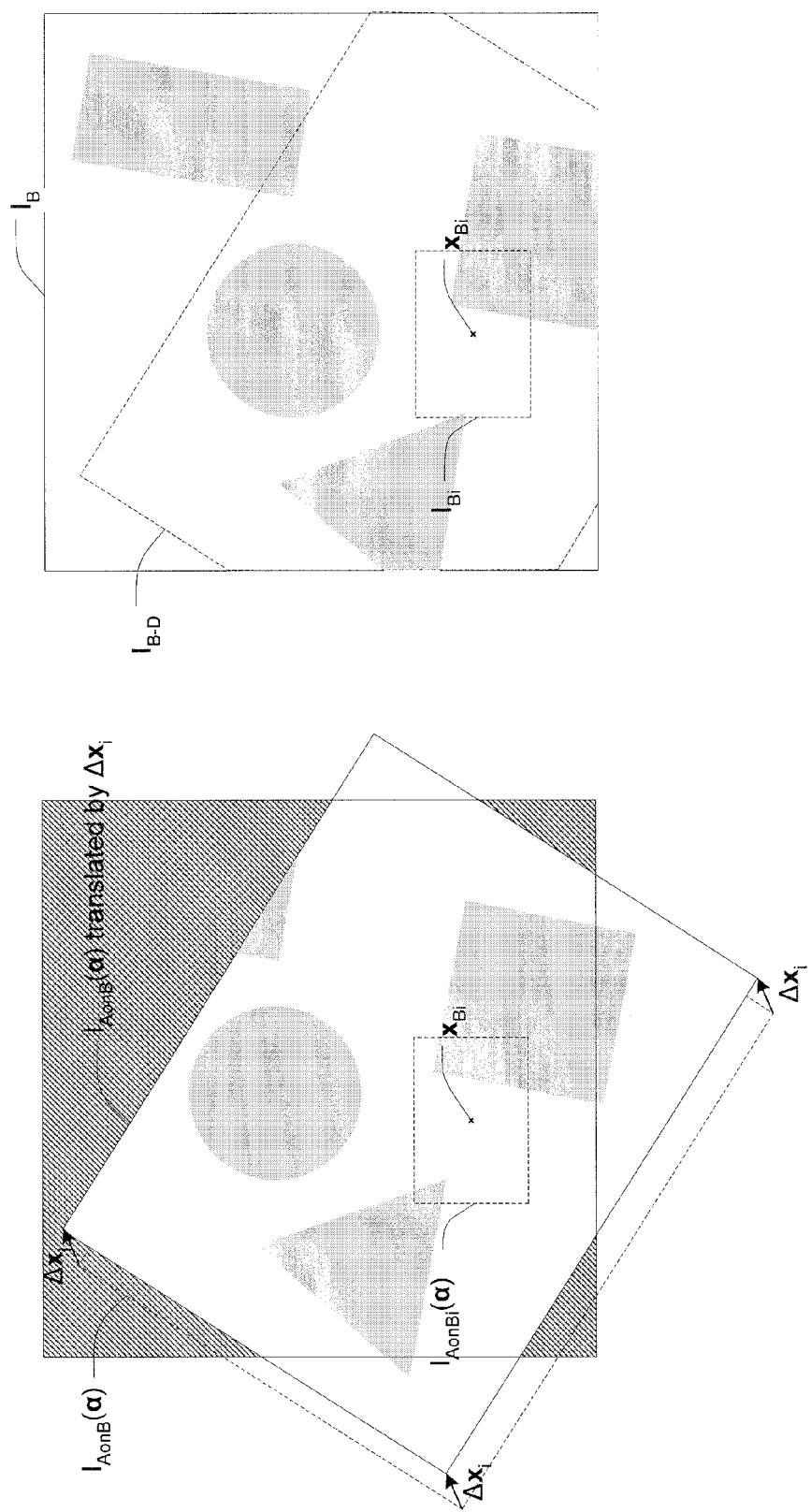
FIG. 11 illustrates a translation by a translation vector in accordance with one embodiment of the invention.

In accordance with one embodiment, at act 330, a similarity function $G_i(\Delta x_i)$ expressed in terms of a translation vector $\Delta x_i$, for region $R_i$ is determined. This "local or region-based" similarity function $G_i(\Delta x_i)$ approximates the behaviour of the similarity between the image $I_B$ and the image $I_{AonB}(\alpha)$ inside region $R_i$, as the image $I_{AonB}(\alpha)$ is translated by the translation vector $\Delta x_i$. FIG. 11 illustrates an example of a translation by the translation vector $\Delta x_i$ in accordance with one embodiment. Further, in the illustrated embodiment, where the entire image $I_{AonBi}$ is translated the location of the image $I_{AonBi}(\alpha)$ that defines the region $R_i$ remains fixed within domain $D_B$. However, as the image $I_{AonB}(\alpha)$ is translated the locations in the image $I_A$ that correspond to locations in the region $I_{AonBi}$ (α) change. In other words, the content of the region $I_{AonBi}(\alpha)$ may change with the translation of the image $I_{AonB}(\alpha)$. For example, a location in image $I_A$ that originally corresponds to a location in region $R_i$ may with sufficient translation of the region $I_{AonBi}(\alpha)$ no longer correspond to any location in the region $R_i$. According to one embodiment, a maximum amount of translation is selected by a user. In a version of this embodiment, the maximum amount of translation is set as a ratio of a dimension of the regions, for example, twice the width of a region.

In one embodiment, at act 340, the translation parameter $\Delta x_i$ is expressed in terms of the transformation change vector $\Delta\alpha$. As a result, in this embodiment, a similarity function $G_i(\alpha'=\alpha+\Delta\alpha)$ (e.g., a local similarity function) for region $R_i$ as a function of the transformation change vector α', is determined. The similarity function $G_i(\alpha')$ approximates the behaviour of the similarity between the image $I_B$ and the image $I_{AonB}(\alpha')$ inside region $R_i$.

According to one embodiment, at step 345, the similarity function $G_i(\alpha')$ determined at step 340 is added to a sum of the similarity functions $G_i(\alpha')$ determined for each of the processed regions $R_i$. That is, according to one embodiment, the similarity function $G_i(\alpha')$ is determined in turn for a plurality of regions $R_1$, $R_2$, and $R_3$. Where, for example, the regions are processed in numerical order: a first similarity function $G_1(\alpha')$ is determined for a first region—the value of the first similarity function $G_1(\alpha')$ is the total of the sum at act 345 at this stage of processing; a second similarity function $G_2(\alpha')$ is determined next for a second region and is added to the previously determined sum—the value of the first similarity function plus the value of the second similarity function is the total of the sum at act 345 at this stage of processing; and a third similarity function $G_3(\alpha')$ is determined next for a third region and is added to the previously determined sum—the total of the sum at act 345 at this stage of processing is the sum of the value of the first similarity function, the value of the second similarity function and the value of the third similarity function.

According to one embodiment, at act 350, if all $N_R$ regions $R_i$ have been processed, the process proceeds to act 360. Alternatively, where a similarity function $G_i(\alpha')$ has not been determined for all the regions selected for processing the process returns to act 320.

In accordance with one embodiment, at act 360, the similarity function $G(I_A, I_B, \alpha')$ (e.g., the global similarity function) is established as the final value of the sum:

$$G(I_A, I_B, \alpha') = G(\alpha') = \sum_{i=1}^{N_R} G_i(\alpha') \qquad \text{Eq. 7}$$

That is, once all the desired regions have been processed, the similarity function $G(I_A, I_B, \alpha')$ is known for a particular value of the transformation vector. According to one embodiment, the value of the transformation vector $\alpha$ is known, so the "global" similarity function is strictly a function of the transformation vector $\alpha'$ and, therefore, denoted $G(\alpha')$. At act 360, the value $\alpha'_{MAX}$ of the transformation change vector $\alpha'$ that maximizes the generated similarity function $G(\alpha')$ is determined.

Thus, at act 360, in one embodiment, a similarity function for a first value of the transformation vector is known. Further, a value of the transformation vector that maximizes the similarity function for that first value of the transformation vector is determined at act 360 in accordance with one embodiment.

In accordance with one embodiment, each succeeding value of the transformation vector is established by replacing the value of the immediately preceding transformation vector a by the transformation vector $\alpha'_{MAX}$ that maximizes the similarity function for the preceding value of the transformation change vector. The acts described for the process 70 may be repeated for each succeeding value of the transformation vector, if necessary.

Figure 12:
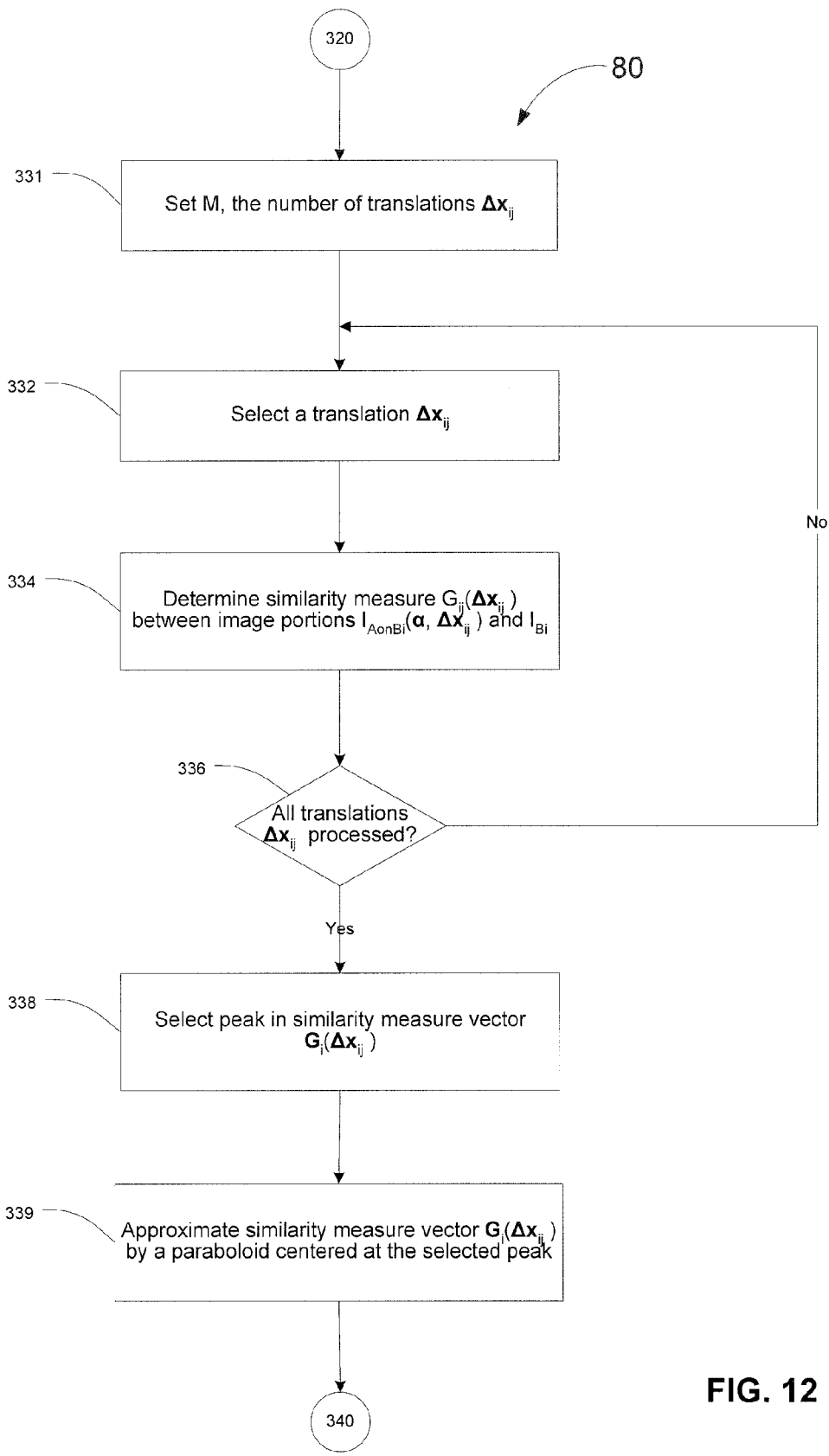
FIG. 12 illustrates a more detailed flow diagram of a portion of the process of FIG. 10 according to another embodiment of the invention.

In accordance with one embodiment, further details concerning the act 330 are illustrated in FIG. 12. In general, the illustrated acts concern a process 80 employed to determine the similarity function $G_i(\Delta x_i)$ expressed in terms of a translation vector $\Delta x_i$, for region $R_i$ in accordance with one embodiment.

As is explained below, embodiments of the process 80 determine the similarity function $G_i(\Delta x_i)$ by applying a plurality of translation vectors to the region $R_i$. Each translation vector applied to the region $R_i$ is noted $\Delta x_{ij}$. That is, for a first region $R_1$, the translation vectors $\Delta x_{ij}$ are applied to determine the similarity function $G_1(\Delta x_{1j})$. According to one embodiment, a total of M translations $\Delta x_{ij}$ is established; therefore, for a first region $R_1$, the translation vectors $\Delta x_{11}$ to $\Delta x_{1M}$ are applied to determine the similarity function $G_1(\Delta x_{1j})$. In a further embodiment, each translation can be measured by the quantity of pixels by which the region $R_i$ is shifted in either or both of the x direction and the y direction. In accordance with one embodiment, each translation $\Delta x_{1j}$, where j=1 to M, provides a shift in at least one of the x direction and the y direction by an integer number of pixels. In a further embodiment, the translation vectors are chosen to include all the vectors that contain integer values for the shifts in x and y directions that are between a minimum (possibly negative) and a maximum value.

According to the above described embodiment, the region $R_i$ moves relative to the image $I_{AonB}(\alpha)$ according to the change in position resulting from each translation. As a result, in one embodiment, the length of each translation determines the distance at which the region $R_i$ moves relative to the image $I_{AonB}(L)$.

According to one embodiment, the maximum length of the translations $\Delta x_{ij}$ is chosen based on an estimate of the uncertainty (e.g., provided by the user) associated with the estimated value of the transformation vector $\alpha$ which is initially employed. For example, the camera that has acquired the image has moved by a maximum distance between the acquisitions of the two images, this maximum distance can be transformed into a maximum translation between the corresponding positions in the two images.

Referring further to FIG. 12, at act 331, a quantity of M translations is established for a region $R_i$ where each translation results from the translation vector $\Delta x_{ij}$, where j=1 to M. In the illustrated embodiment, the process 80 is an iterative process that determines the similarity measure $G_{ij}$ for each of the total of M translations, e.g., from a plurality of translations. Accordingly, in this embodiment, a translation from among the translations $\Delta x_{ij}$ is selected at act 332. Referring again to FIG. 11, the translation may include a translation in the x direction and the y direction. Accordingly, the selected translation can be represented as $\Delta x_{ij} = (\Delta x_{ij}\ \Delta y_{ij})^T$.

Figure 13:
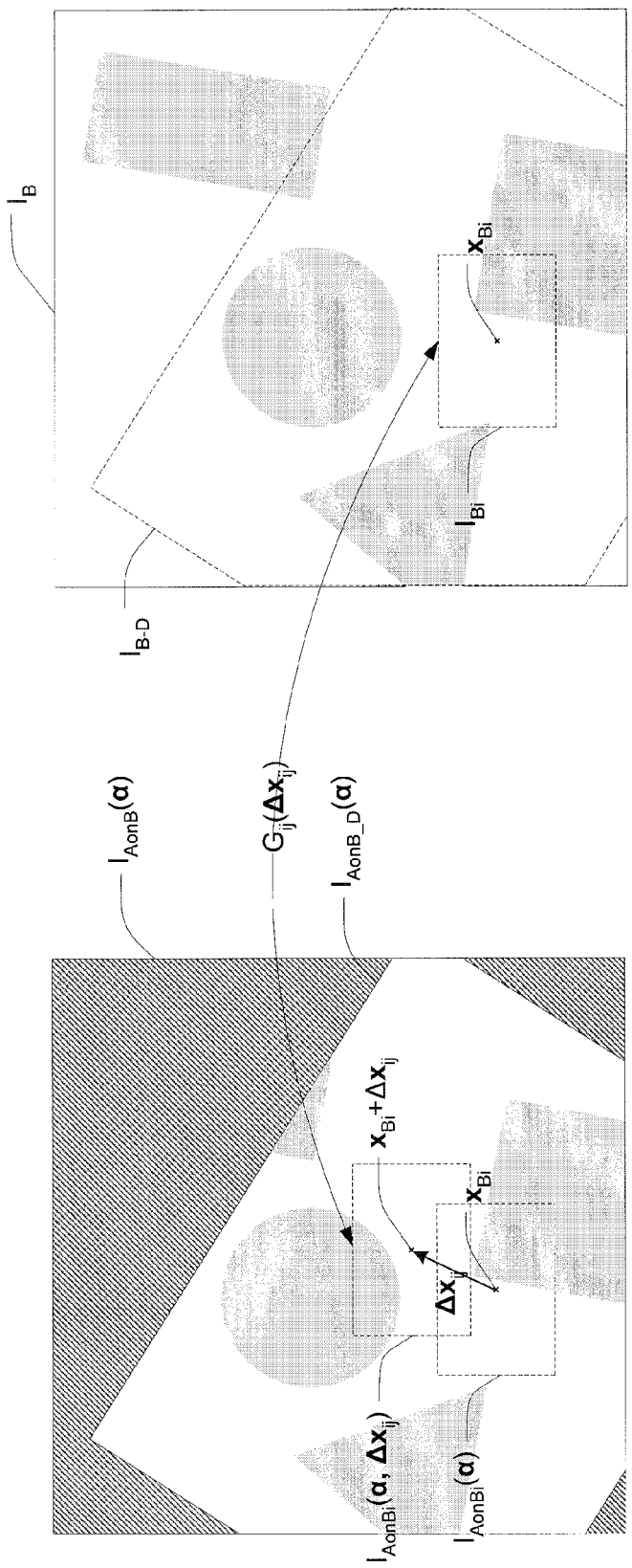
FIG. 13 illustrates a translation of a region in accordance with an embodiment of the invention.

FIG. 13 illustrates a translation of a region $R_i$ (e.g., a rectangular region centered at $x_{Bi}$) in accordance with one embodiment. In the illustrated embodiment, the location of the image $I_{AonBi}$ that corresponds to the region $R_i$ shifts in the domain $D_B$ according to the value of the translation vector $\Delta x_{ij}$. That is, in FIG. 13, the translation vector $\Delta x_{ij}$ illustrates the translation from the image $I_{AonBi}(\alpha)$ that corresponds to the region $R_i$ to an image $I_{AonBi}(\alpha, \Delta x_{ij})$ that corresponds to a region $R_i(\Delta x_{ij})$ (e.g., a rectangular region centered at $x_{Bi} + \Delta x_{ij}$) following the translation.

In accordance with one embodiment, at act 334, the similarity measure $G_i(\Delta x_{ij})$ (e.g., the local similarity measure) between the image $I_{AonBi}(\alpha, \Delta x_{ij})$ and $I_{Bi}$ is determined. In one embodiment, a Normalized Grayscale Correlation (NGC) is used to determine the similarity measure $G_i(\Delta x_{ij})$ measured between the two image portions. Other approaches may be employed, however, to determine the similarity measure $G_i(\Delta x_{ij})$ measured between two image portions. As one example, the similarity measure $G_i(\Delta x_{ij})$ can be determined using other similarity measures that can be calculated locally, e.g., the sum of absolute differences. Preferably, the type of similarity measure is chosen based on the type of the images (e.g., grayscale image, edge image) and/or characteristics of the images.

For example:

For two grayscale images having similar contrast and/or average intensity, the sum of absolute differences is a suitable similarity measure.

For two grayscale images having different contrast and/or average intensity,

Normalized Grayscale Correlation (NGC) is a suitable similarity measure.

For two grayscale images acquired by different types of sensors (e.g., radar and visible), a similarity measure known as "Mutual Information" is a suitable similarity measure.

For two edge images, the sum of the distances between each edge element in the first image portion and the closest edge element in the second image portion.

According to one embodiment, at act 336, a determination is made whether each of the total of M translations have been processed. According to this embodiment, the process 80 proceeds to act 338 if all M translations $\Delta x_{ij}$ have been processed. Alternatively, the process 80 returns to step 332, at which another translation $\Delta x_{ij}$ is selected. As mentioned above, in one embodiment, the acts 332 and 334 are repeated for all of the total of M translations.

According to one embodiment, a similarity measure vector $G_i(\Delta x_{ij})$, can be defined for the region $R_i$ once all the translations $\Delta x_{ij}$ have been processed. In a version of this embodiment, the similarity measure vector $G_i(\Delta x_{ij})$ is determined following act 336. In a further embodiment, the similarity measures $G_i(\Delta x_{ij})$ is determined for each of the total of M translations $\Delta x_{ij}$ calculated for the region $R_i$. As illustrated in FIG. 11, each translation (i.e., the translations corresponding to the translation vectors $\Delta x_{i1}$ to $\Delta x_{iM}$ for the region $R_i$ may include a translation in either or both of the x direction and the y direction. Accordingly, the resulting similarity measure vector $G_i(\Delta x_{ij})$ may be expressed as a discrete two dimensional function $G_i(\Delta x_{ij}, \Delta y_{ij})$ as represented in Equation 8.

$$G_i(\Delta x_{ij}) = G_i(\Delta x_{ij}, \Delta y_{ij}) = \begin{bmatrix} G_i(\Delta x_{i1}, \Delta y_{i1}) \\ G_i(\Delta x_{i2}, \Delta y_{i2}) \\ \vdots \\ G_i(\Delta x_{iM}, \Delta y_{iM}) \end{bmatrix} \qquad \text{Eq. 8}$$

One of skill in the art will recognize that Equation 8 describes a discrete, non-parameterized version of the similarity function $G_i(\Delta x_i)$ (e.g., the local similarity function for the region $R_i$ determined by the process 80 in accordance with one embodiment.)

In one embodiment, a maximum (or peak) in the similarity measure vector $G_i(\Delta x_{ij})$ for the region $R_i$ is determined at step 338, e.g., a "local" maximum or peak is determined. This maximum similarity measure vector $G_i(\Delta x_{ij})$ can be determined in a number of ways. For example, the absolute maximum (or highest peak) can be determined. In this embodiment, the translation vector $\Delta x_{ij}$ that generates the maximum is identified as $\Delta x_{0i} = (\Delta x_{0i} \ \Delta y_{0i})^T$. The similarity measure vector $G_i(\Delta x_{0i})$ that corresponds to the maximum can be identified as $G_{0i}$.

In accordance with a further embodiment, at act 339, the similarity measure vector $G_i(\Delta x_i)$ is approximated by paraboloid centered at the selected peak. According to one embodiment, the similarity function is approximated using a paraboloid form around the chosen peak as follows:

$$G_i(\Delta x_i) = G_{0i} + a(\Delta x_i - \Delta x_{0i})^2 + 2b(\Delta x_i - \Delta x_{0i})(\Delta y_i - \Delta y_{0i}) + c(\Delta y_i - \Delta y_{0i})^2 \qquad \text{Eq. 9}$$

Equation 9 can, with matrix notation, be expanded and described as:

$$G_i(\Delta x_i) = G'_{0i} + 2b_i^T \Delta x_i + \Delta x_i^T A_i \Delta x_i \qquad \text{Eq. 10}$$

where, $$G'_{0i} = G_{0i} + a_i \Delta x_{0i}^2 + 2b_i \Delta x_{0i} \Delta y_{0i} + c_i \Delta y_{0i}^2 \qquad \text{Eq. 11}$$

$$b_i = \begin{pmatrix} 2a_i \Delta x_{0i} - 2b_i \Delta y_{0i} \\ 2c_i \Delta y_{0i} - 2b_i \Delta x_{0i} \end{pmatrix}$$

$$A_i = \begin{pmatrix} a_i & b_i \\ b_i & c_i \end{pmatrix}$$

The resulting matrix $A_i$ is a 2×2 symmetric matrix with negative or zero eigenvalues because the similarity function decreases as $\Delta x_i$ moves away from the peak value $G_{0i}$ at $\Delta x_{0i}$.

In one embodiment, the determination of the parameters $A_i$ and $b_i$ describing the paraboloid can be done by calculating the values of the similarity function $G_i(\Delta x_i)$ at few translations around the chosen peak (per example, in translations in 8 directions, all 1 pixel away) and by calculating the best paraboloid using a least square method. In a further embodiment, the eigenvalues of $A_i$ should be limited to negative or zero. In another embodiment, the paraboloid parameter $A_i$ can be extracted from the similarity measure of the region $R_i$ with a translated version of itself. In another embodiment, paraboloid parameters $A_i$ and $b_i$ can be modified to reduce the curvature of the paraboloid in the direction of the other peaks (not selected) to represent the uncertainty of the position in this direction. One skilled in the art will appreciate that, although a paraboloid is used to approximate the similarity function $G_i(\Delta x_i)$, various other types of parametrized functions can also be used. For example, a Gaussian function.

Figure 14:
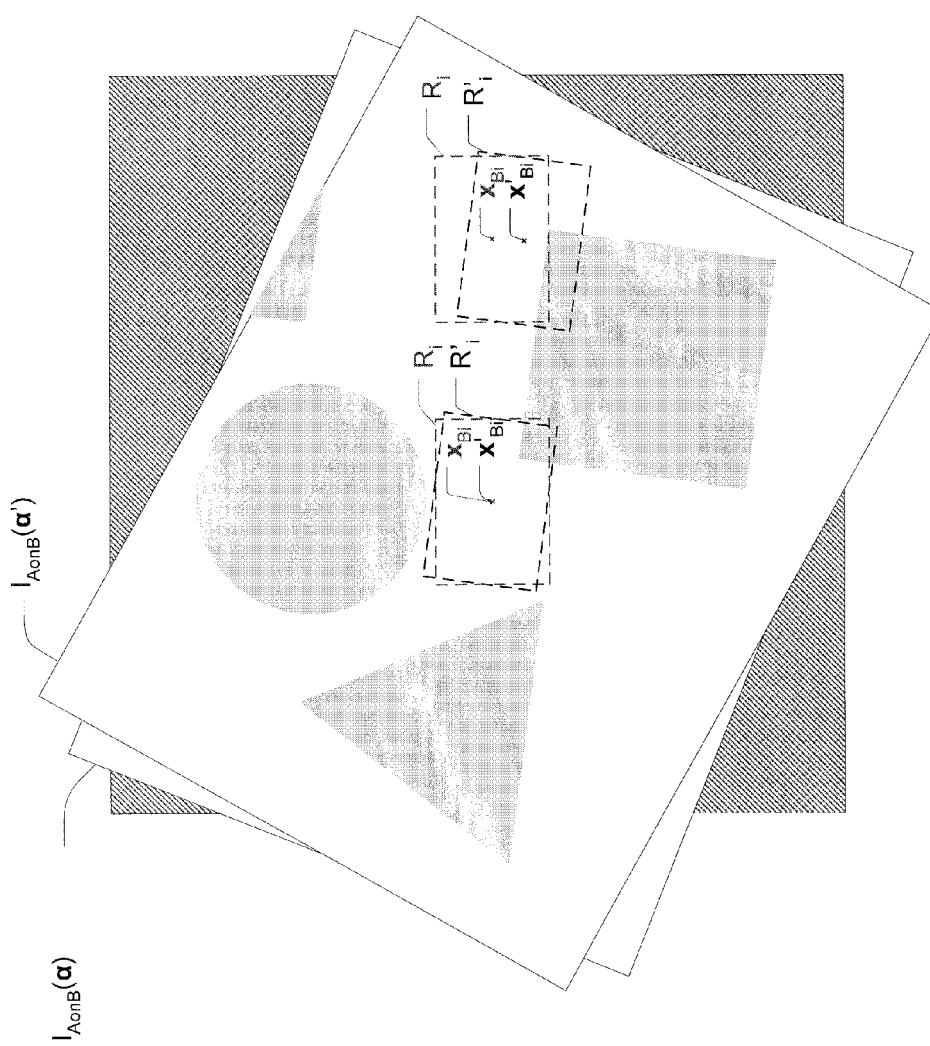
FIG. 14 illustrates a translation of a plurality of regions in accordance with an embodiment of the invention.

In accordance with another embodiment, the act 340 includes an act of determining the translation vector $\Delta x_i$, for region $R_i$, as a function of the transformation change vector $\Delta \alpha$ as mentioned above. Referring to FIG. 14, a first image $I_{AonB}(\alpha)$ (i.e., the transformation of the image A onto the domain $D_B$ as a function of the transformation vector $\alpha$) and a second image $I_{AonB}(\alpha' = \alpha + \Delta \alpha)$ (i.e., the translation of the image A onto the domain $D_B$ as a function of the transformation vector $\alpha$ modified by the transformation change vector $\Delta \alpha$) are illustrated. That is, changing the transformation vector $\alpha$ by the amount provided by the transformation change vector $\Delta \alpha$ causes the content of a region $R_i$ in the image $I_{AonB}(\alpha)$ to move to a different location in the image $I_{AonB}(\alpha + \Delta \alpha)$. According to the illustrated embodiment, the "movement" that results from the addition of the transformation change vector $\Delta \alpha$ includes a rotation of the image $I_A$ from the position illustrated by the image $I_{AonB}(\alpha)$ to the position illustrated by the image $I_{AonB}(\alpha + \Delta \alpha)$.

FIG. 14 also illustrates a first region $R_i$, located at approximately the center of the image $I_{AonB}(\alpha)$ and a second region $R_i$, located in the right half of the image $I_{AonB}(\alpha)$ where each region is centered at a different position $x_{Bi}$, e.g., a first region $R_1$ centered at a position $x_{B1}$ and a second region $R_2$ centered at $x_{B2}$. In addition, FIG. 14 illustrates a first region $R'_i$ and a second region $R'_i$ associated with the image $I_{AonB}(\alpha + \Delta \alpha)$, e.g., a first region $R'_1$ centered at a position $x'_{B1}$ and a second region $R'_2$ centered at $x'_{B2}$.

As illustrated in FIG. 14, the content of region $R_i$ centered at position $x_{Bi}$ of the image A mapped onto the domain $D_B$ with the transformation vector $\alpha$ moves into a region $R'_i$ of the image. The region $R_i$ is centered at a position $x'_{Bi}$ as a result of the addition of the transformation change vector $\Delta \alpha$. Because the transformation vector α may include transformation parameters α associated with the scale of the image, the perspective of the image, etc. the shape and dimensions of the region $R'_i$ can differ from those of the corresponding region $R_i$, e.g., where the change $\Delta\alpha$ consists of an additional scale or perspective change.

Figure 15:
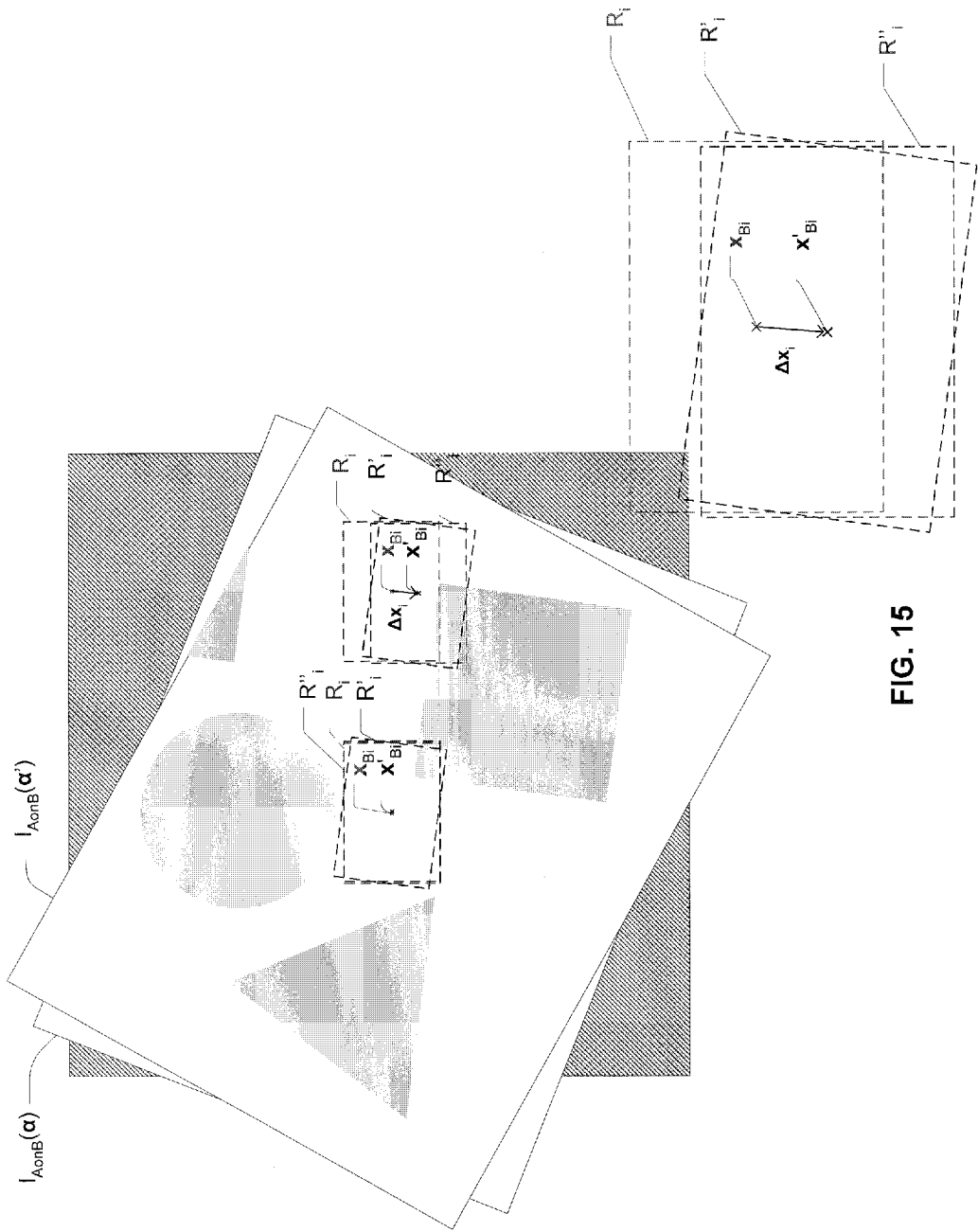
FIG. 15 illustrates a translation of a plurality of regions in accordance with a further embodiment of the invention.

FIG. 15 illustrates the results of the addition of the transformation change vector $\Delta\alpha$ to the transformation vector α in accordance with an embodiment where the results of the addition of the vector $\Delta\alpha$ are approximated by a translation vector $\Delta x_i$. That is, a region $R''_i$ is obtained by translating the region $R_i$ by a translation vector $\Delta x_i$ as defined according to Equation 12:

$$\Delta x_i = x'_{Bi} - x_{Bi} \qquad \text{Eq. 12}$$

As mentioned above, the translation resulting from the translation vector $\Delta x_{Bi}$ may be employed to approximate the effect of a change in one or more transformation parameters α of the transformation vector α regardless of whether the change includes any translation, that is, regardless of whether the change includes a change in translation in either the x or y direction.

In accordance with one embodiment, FIG. 15 illustrates a region $R_i$ centered at $x_{Bi}$ that represents the content of image A mapped onto the domain $D_B$ for a first value of the transformation vector α. In accordance with this embodiment, FIG. 15 also illustrates a second region $R'_i$ centered at $x'_{Bi}$ that illustrates the content of image A mapped onto the domain $D_B$ for a second value of the transformation vector α, e.g., where the second value of the transformation vector equals $\alpha+\Delta\alpha$. Further, FIG. 15 illustrates a third region $R''_i$ also centered at $x'_{Bi}$ that illustrates the content of image $I_{AonB}(\alpha)$ around $x'_{Bi}$ in a region of the same dimension and orientation as $R_i$. One embodiment can use "approximation by translation" to approximate that the content of region $R'_i$ is similar to content of region $R''_i$. This embodiment approximates the "movement" of the region $R_i$ caused by $\Delta\alpha$ with a translation $\Delta x_i$.

According to one embodiment, the actual value of the translation vector $\Delta x_i$ (used to approximate the effect of the transformation change vector $\Delta\alpha$ on a particular region $R_i$) can be determined using the following equation:

$$\Delta x_i = x'_{Bi} - x_{Bi} = f_{AB}(f_{BA}(x_{Bi},\alpha),\alpha+\Delta\alpha) - x_{Bi} \qquad \text{Eq. 13}$$

In a further embodiment, the value of the translation vector $\Delta x_i$ can be determined by making another approximation. That is, according to one embodiment, the value of the translation vector $\Delta x_i$ is determined according to the following product:

$$\Delta x_i = J(x_{Bi},\alpha)\Delta\alpha = J_i \Delta\alpha \qquad \text{Eq. 14}$$

where $J(x_i, \alpha)$, or simply $J_i$, denotes the value of a Jacobian vector $J(x, \alpha)$ at position $x_{Bi}$ of the image $I_{AonB}(\alpha)$ for the current value of the transformation vector α.

The Jacobian vector $J(x, \alpha)$ is defined as shown in Equation 15:

$$J(x, \alpha) = \qquad \text{Eq. 15}$$
$$\begin{pmatrix} \partial f_{xAB}(f_{BA}(x, \alpha), \alpha')/\partial \alpha'_0 & \partial f_{xAB}(f_{BA}(x, \alpha), \alpha')/\partial \alpha'_1 & \ldots \\ \partial f_{yAB}(f_{BA}(x, \alpha), \alpha')/\partial \alpha'_0 & \partial f_{yAB}(f_{BA}(x, \alpha), \alpha')/\partial \alpha'_1 & \ldots \end{pmatrix}$$

The first row of the Jacobian vector $J(x, \alpha)$ contains the partial derivatives, a $\partial f_{xAB}(f_{BA}(x, \alpha), \alpha')/\partial \alpha'_k$, of the x-component of the function $f_{xAB}(f_{BA}(x, \alpha), \alpha')$ with respect to each of the transformation parameters $\alpha'_k$ of the transformation vector $\alpha'=(\alpha'_0\ \alpha'_1\ \ldots\ \alpha'_{N-1})^T$. Each partial derivative approximates the displacement $\Delta x$ caused by a small change in the respective parameter $\alpha'_k$ of the transformation vector $\alpha'=(\alpha'_0\ \alpha'_1\ \ldots\ \alpha'_{N-1})_T$. The second row contains the partial derivatives of the y-component. As illustrated in FIG. 15, the same transformation change vector $\Delta\alpha$ causes a different translation $\Delta x_i$ in each region $R_i$ according to the value of the Jacobian vector $J(x_{Bi}, \alpha)$ at the center $x_{Bi}$ of the respective region.

Referring again to FIG. 10, at act 330, a similarity function $G_i(\Delta x_i)$ is determined that approximates the behaviour of the similarity between the image $I_B$ and the image $I_{AonB}(\alpha)$ inside region $R_i$ as a function of the translation $\Delta x_i$ applied to the image $I_{AonB}(\alpha)$ in accordance with one embodiment. Accordingly, for the region $R_i$ centered at position $x_{Bi}$, the result of applying a change $\Delta\alpha$ to region $R_i$ may be considered to be the equivalent to translating the region $R''_i$ centered at position $x'_{Bi}=x_{Bi}+\Delta x_i$ by a translation $(-\Delta x_i)$ to align it with region $R_i$, In one embodiment, this translation of $-\Delta x_i$ can be estimated by $-J_i\Delta\alpha$ according to Eq. 15. In accordance with one embodiment, the region $R''_i$ is approximately the result of applying a change $\Delta\alpha$ to region $R_i$. Further to this embodiment, at act 340, the translation parameter vector $\Delta x_i$ is expressed in terms of the transformation change vector $\Delta\alpha$ as follows:

$$-\Delta x_i = -J(x_{Bi},\alpha)\Delta\alpha = -J_i\Delta\alpha \qquad \text{Eq. 16}$$

In one embodiment, the value $J(x_{Bi}, \alpha)$ (given by equation 3) can be calculated according to the following steps:

1) Calculate the derivatives of the transformation functions $f_{xBA}$ and $f_{yBA}$ according to every transformation parameters $\alpha'_k$;

2) Calculate the position $x_{Ai}$ in image $I_A$ by replacing the center of the region $x_{Bi}$ and the current value of the transformation vector α in the transformation function: $x_{Ai}=f_{BA}(\alpha, x_{Bi})$;

3) Replace the calculated position $x_{Ai}$ in image $I_A$ and the current value of the transformation vector α in the calculated derivatives of the transformation functions $f_{xBA}$ and $f_{yBA}$.

Finally, substituting the translation parameter $\Delta x_i$ in the equation of the similarity function $G_i(\Delta x_i)$ determined at step 330 yields the similarity function $G_i(\alpha')$ (e.g., the local similarity function) expressed in terms of the transformation change vector $\Delta\alpha$:

$$G_i(\alpha') = G'_{0i} + 2b_i^T(-J_i\Delta\alpha) + (-J_i\Delta\alpha)^T A_i(-J_i\Delta\alpha) \qquad \text{Eq. 17}$$
$$= G'_{0i} - 2b_i^T J_i\Delta\alpha + \Delta\alpha^T J_i^T A_i J_i \Delta\alpha$$

where $$G'_{0i} = G_{0i} + a_i\Delta x_{0i}^2 + 2b_i\Delta x_{0i}\Delta y_{0i} + c_i\Delta y_{0i}^2$$

$$b_i = \begin{pmatrix} 2a_i\Delta x_{0i} - 2b_i\Delta y_{0i} \\ 2c_i\Delta y_{0i} - 2b_i\Delta x_{0i} \end{pmatrix}$$

$$A_i = \begin{pmatrix} a_i & b_i \\ b_i & c_i \end{pmatrix}$$

According to a further embodiment, all the local similarity measures are summed to determine the global similarity measure as follows:

$$G(\alpha') = \sum G_i(\alpha') \qquad \text{Eq. 18}$$
$$= G'_{0i} + \sum(-2b_i^T J_i\Delta\alpha) + \sum(\Delta\alpha^T J_i^T A_i J_i\Delta\alpha)$$
$$= G_0 + 2b^T\Delta\alpha + \Delta\alpha^T A\Delta\alpha$$

-continued where $$G_0 = \sum_i G'_{0i}$$

$$b = \sum_i -b_i^T J_i$$

$$A = \sum_i J_i^T A_i J_i$$

According to one embodiment, the value $\alpha'_{MAX}$ that optimizes the similarity measure $G(\alpha')$ is:

$$\alpha'_{MAX} = \alpha - A^{-1} b \qquad \text{Eq. 19}$$

Figure 16:
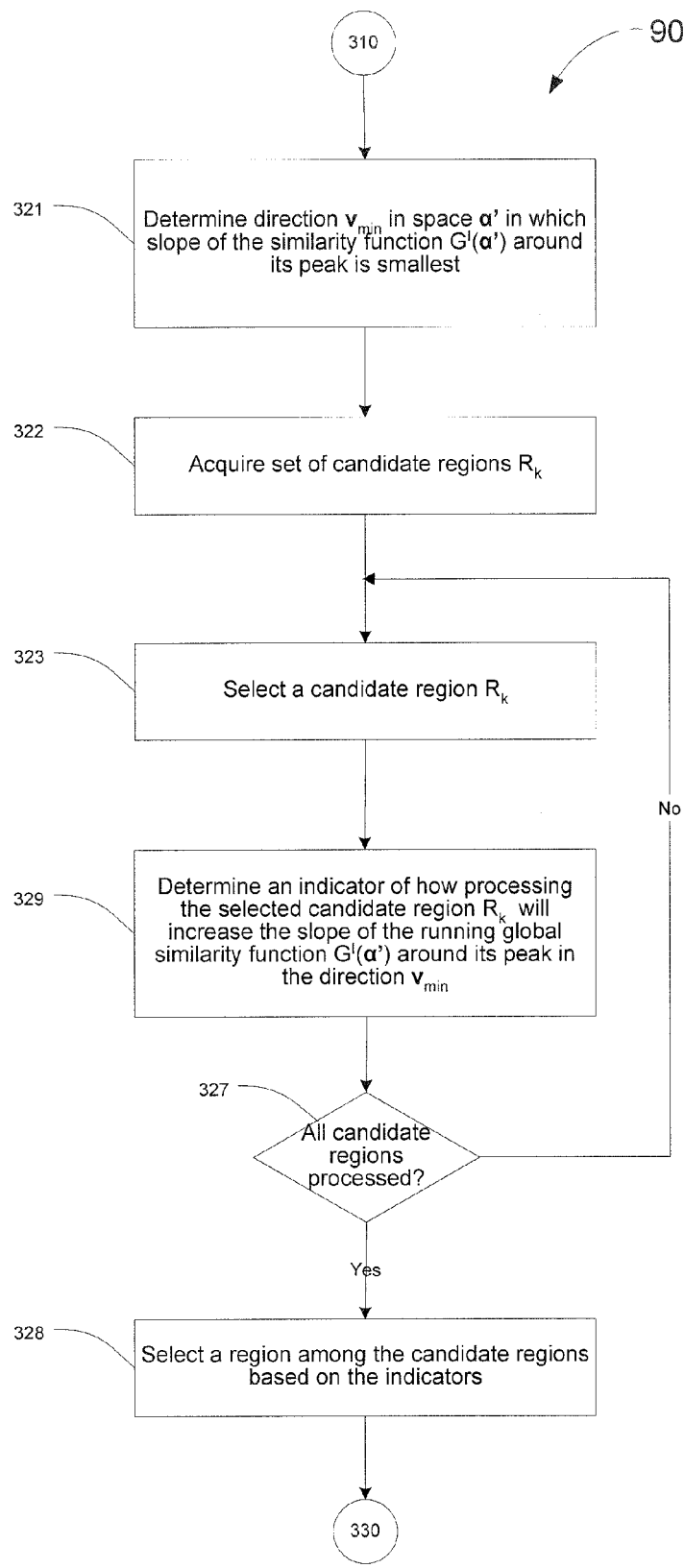
FIG. 16 illustrates a more detailed flow diagram of a portion of the process of FIG. 10 in accordance with a further embodiment of the invention.

FIG. 16 illustrates a process 90 for selecting a region that may be included in various embodiments of the act 320 which was described with reference to FIG. 10. In accordance with one embodiment, the following acts are performed once at least one region $R_i$ has been processed (e.g., according to acts 320-350 of the process 70). In general and in accordance with one embodiment, the process 90 is employed to select a new region for processing by: 1) determining the parameter or combination of parameters $\alpha'_k$ of the transformation vector $\alpha'$ having the greatest associated uncertainty based on the regions $R_i$ processed up to that point in the process; 2) acquiring a set of candidate regions; 3) for each candidate region, determining an indicator of how the processing of the candidate region (e.g., the processing according to acts 320-350 of the process 70) will reduce the uncertainty associated with the previously determined parameter or combination of parameters; and 4) selecting a region from among the candidate regions based on the previously determined indicators.

According to one embodiment, the region is selected from among the set of candidate regions because it is the region that will reduce the uncertainty by the greatest amount (e.g., as measured by the indicators determined for each of the candidate regions). In various embodiments, other factors can be considered when selecting a region, for example, the contrast level in the candidate region and/or whether the candidate region contains objects. That is, it may be beneficial to select a region with a high contrast level and one that does not have a uniform appearance (e.g., does not consist solely of a solid or textured background).

Figure 17:
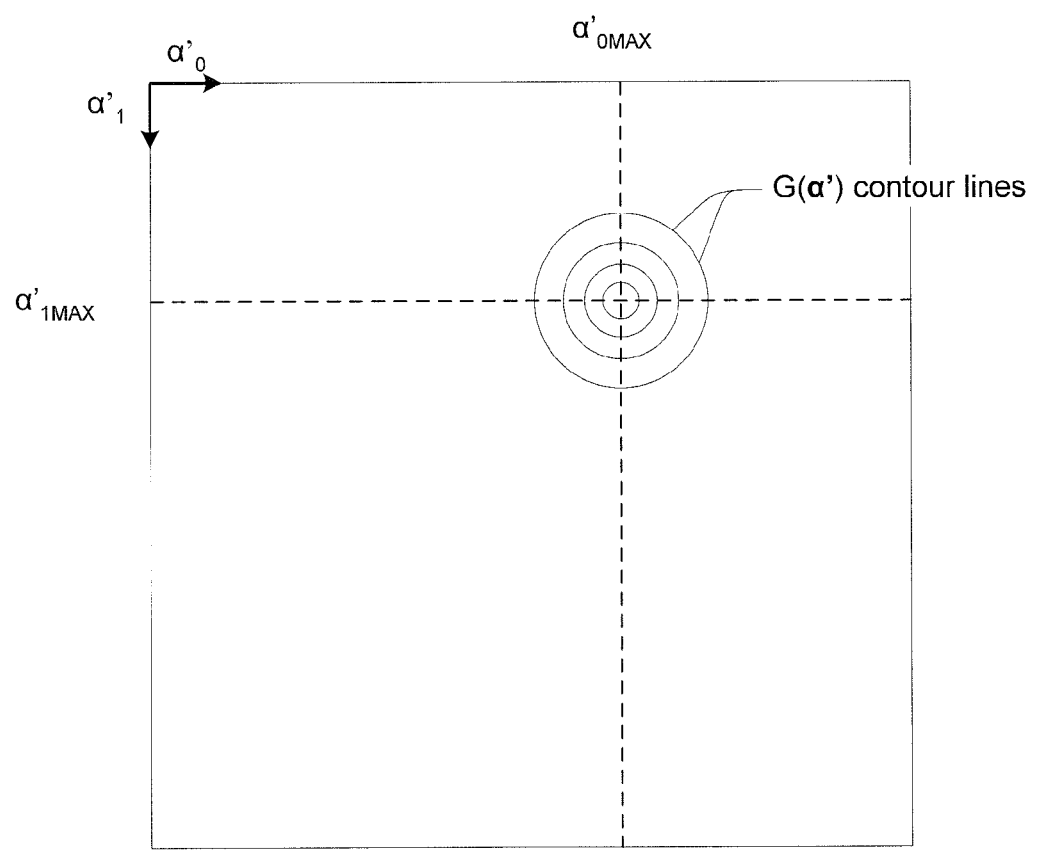
FIG. 17 illustrates a plot of a similarity function in accordance with one embodiment of the invention.

FIGS. 17, 18A-18C, 19A and 19C included herewith provide plots of similarity functions in accordance with one embodiment. These figures show illustrations of an embodiment where the transformation vector $\alpha'$ has 2 components, $\alpha'_0$ and $\alpha'_1$. Other embodiments can include transformation vectors with a different number of transformation parameters. In particular, FIG. 17 provides a plot of the similarity function $G(\alpha')$ determined for a set of regions (e.g., the similarity function referred to at act 300 illustrated in FIG. 7 as determined for the set of $N_R$ regions) in accordance with one embodiment. As described previously, according to one embodiment, the similarity function $G^I(\alpha')$ equals the sum of the similarity functions $G_i(\alpha')$ of each of the regions $R_i$ that have already been processed:

$$G^I(\alpha') = \sum_{i=1}^{I} G_i(\alpha') \qquad \text{Eq. 20}$$

where I is the number of regions $R_i$ that have already been processed. The similarity function $G^I(\alpha')$ can be viewed as an "intermediate" version of the "final" similarity function $G(\alpha')$ that is obtained once all the regions $R_i$ have been processed. Accordingly, where a set of $N_R$ regions is selected and processed, the "final" similarity function $G(\alpha') = G^I(\alpha')$ results upon the processing of the Nth region, e.g., where I=N. Further, according to this embodiment, it is the "final" similarity function $G(\alpha')$ for which the vector $\alpha'_{MAX}$ is determined at act 360.

Figure 18A:
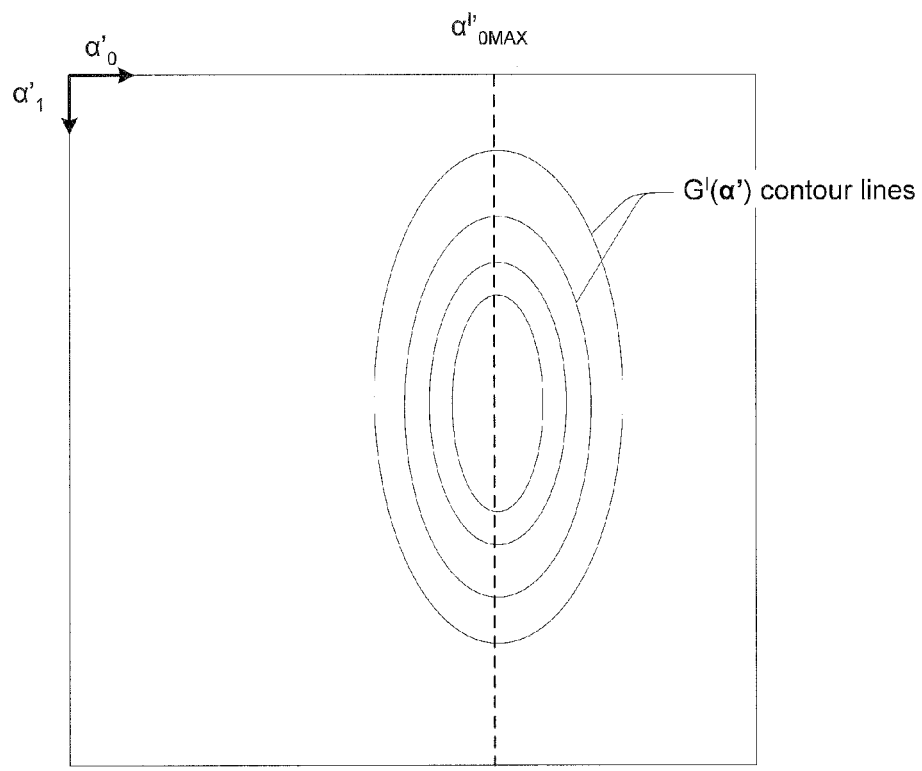
FIGS. 18A-18C illustrates plots of a similarity function in accordance with a further embodiment of the invention.
Figure 18B:
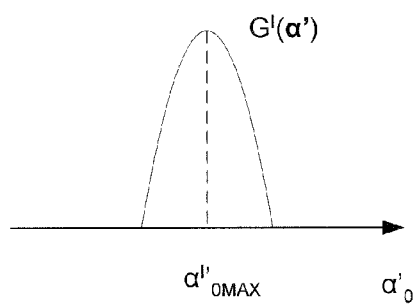
Figure 18C:
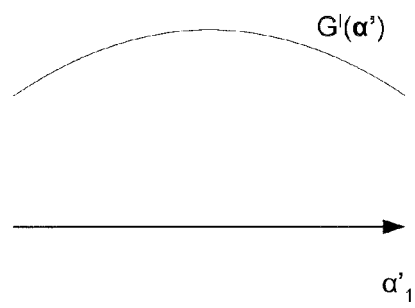
Figure 19A:
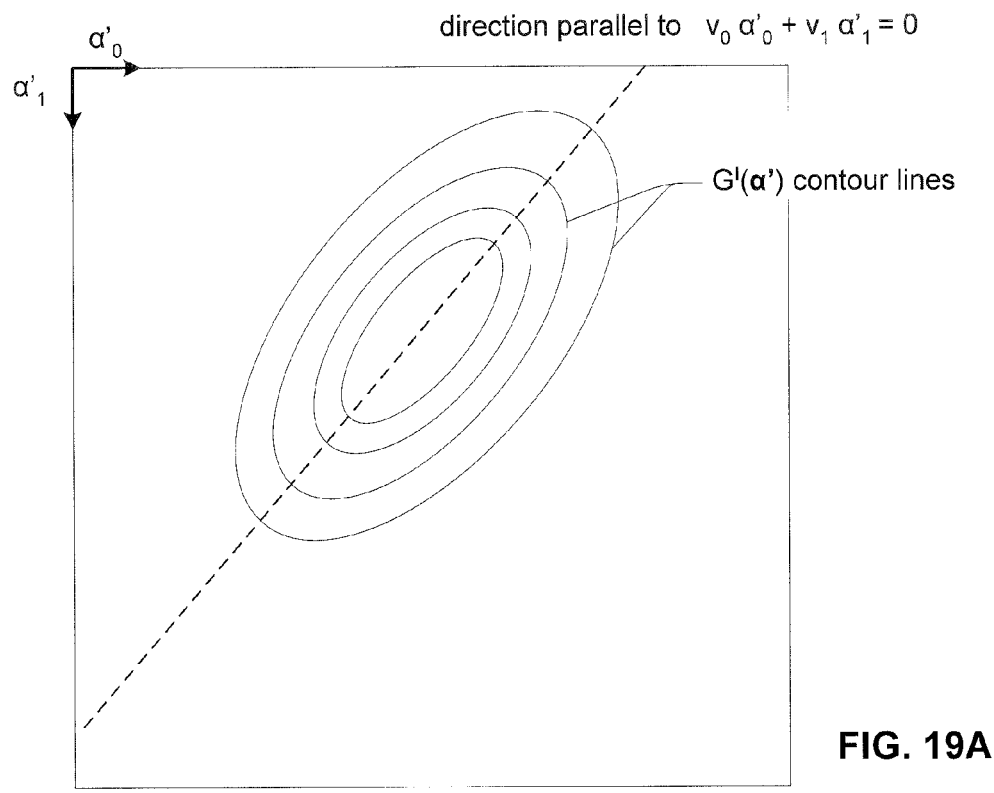
FIGS. 19A and 19B illustrates plots of a similarity function in accordance with a further embodiment of the invention.

FIGS. 18A-18C provide a plot of the similarity function $G^I(\alpha')$, according to first example, at a point in the processing before the last of the total of $N_R$ regions is processed. FIGS. 19A and 19C provide plots associated with another value of the similarity function $G^I(\alpha')$ according to one embodiment. These figures are referred to below concerning the acts associated with the process 90.

In accordance with one embodiment, at act 321, the transformation parameter or combination of transformation parameters $\alpha'_k$ having the greatest associated uncertainty are determined based on the similarity function $G^I(\alpha')$ determined at act 345 of the previous iteration in which the acts 320 to 345 are performed. For example, when the regions $R_1$ and $R_2$ have already been processed, the step 320 proceeds to the selection of the third region and act 321 is performed based on the similarity function $G^2(\alpha')$. As is described in greater detail below, the identification of the transformation parameter(s) having the greatest associated uncertainty is achieved by determining the direction $v_{min}$ in the space $\alpha'$ in which the slope of the similarity function $G^I(\alpha')$ around its peak is the smallest.

According to one embodiment, at act 360 of the process 70, it may be desirable to provide a similarity function $G(\alpha')$ for which the position $\alpha'_{MAX}$ of the peak can be accurately located; that is, it may be desirable to provide a similarity function $G(\alpha')$ whose value decreases sharply as the parameter $\alpha$ moves away from the value $\alpha'_{MAX}$. According to a further embodiment, it is desired to provide a similarity function $G(\alpha')$ whose value decreases sharply as the parameter $\alpha$ moves away from the value $\alpha'_{MAX}$ in all directions in the space $\alpha'$. FIG. 17 illustrates an example of such a function for a 2-dimensional $\alpha'$ in accordance with one embodiment. Here, the peak of the similarity function $G(\alpha')$ illustrated in FIG. 17 is located at $\alpha'_{0MAX}, \alpha'_{1MAX}$.

Accordingly, in one embodiment, the process 90 identifies the transformation parameter(s) having the greatest associated uncertainty in the peak position in the space of transformation vector $\alpha'$ of the similarity function $G(\alpha')$. Returning to the similarity function $G^I(\alpha')$, it has a maximum value at position $\alpha'^h_{MAX}$ in the space of $\alpha'$. The direction in the space $\alpha'$ for which the similarity function $G^I(\alpha')$ decreases the most slowly as the parameter $\alpha'$ moves away from the value $\alpha'^I_{MAX}$ (i.e., has the smallest slope) identifies the parameter or combination of parameters $\alpha'_k$ having the greatest associated uncertainty. In other words, if processing the remaining regions does not sharpen the peak (i.e., increase the slope) in this direction of the space $\alpha'$, there will be large uncertainty about the exact location of the peak in this direction in the final similarity function $G(\alpha')$ (e.g., the final global similarity function).

Figure 19B:
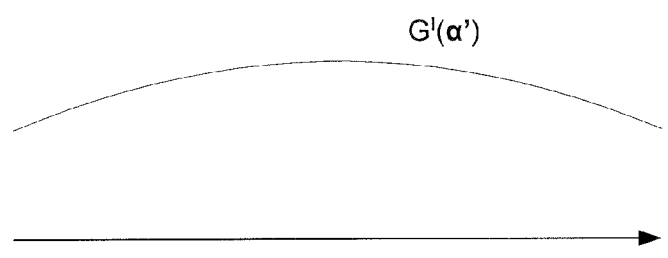

FIGS. 18 and 19 illustrate two different similarity functions $G^I(\alpha')$ for a 2-dimensional $\alpha'$ in accordance with one embodiment. In FIG. 18A, a first similarity function $G^I(\alpha')$ is represented by a set of contour lines. FIGS. 18B and 18C illustrate the first similarity function $G^I(\alpha')$ of FIG. 18A when viewed along lines passing by the point $\alpha'^I_{0MAX}$ and $\Delta^h_{1MAX}$, and respectively parallel to $\alpha'_0$ and $\alpha'_1$. Similarly, in FIG. 19A, a second similarity function $G^I(\alpha')$ is represented by a set of contour lines while FIG. 19B illustrates the second similarity function $G^I(\alpha')$ when viewed along a line passing by the point $\alpha'^h_{0MAX}$ and $\alpha'^h_{1MAX}$ and parallel to the direction $v_0 \alpha'_0 + v_1 \alpha'_1 = 0$.

Accordingly, FIGS. 18A-18C illustrate that the similarity function $G^I(\alpha')$ decreases most slowly around its peak in the direction $\alpha'_1$; therefore, the transformation parameter $\alpha'_1$ has the greatest associated uncertainty. In FIGS. 19A and 19B, the second similarity function $G^I(\alpha')$ decreases most slowly around its peak in the direction $v_0\alpha'_0+v_1\alpha'_1=0$; therefore, this particular combination of the transformation parameters $\alpha_0$ and $\alpha_1$ has the greatest associated uncertainty. The combination $v_0$ and $v_1$ define the vector $v_{min}$ that is the direction of the greatest uncertainty. In one embodiment, the greatest uncertainty vector $v_{min}$ will contain as many components as the number of transformation parameters in the transformation vector $\alpha$.

In one embodiment, at act 322, a set of candidate regions $R_k$ are acquired. In one embodiment, these candidate regions are extracted from a regular grid of positions on the image $I_B$. In the illustrated embodiment, each of the candidate regions $R_k$ is processed in the process 90.

According to a further embodiment, a candidate region $R_k$ is selected at act 323.

In one embodiment, at act 329, an indicator of how the processing of the selected candidate region $R_k$ will reduce the uncertainty associated with the parameter or combination of parameters determined at act 321 is determined. That is, an indicator is determined concerning how the processing of the selected candidate region will increase the slope of the similarity function $G'(a')$ around its peak in the direction $v_{min}$ of the space $\alpha'$.

According to a further embodiment, at act 327, if all candidate regions $R_k$ have been processed, the process proceeds to act 328; otherwise, the process returns to act 323 where another of the candidate regions is selected.

In one embodiment, once all candidate regions $R_k$ have been processed, at act 328, a region among the candidate regions is selected based on the indicators determined for each of the candidate regions. That is, if no other factors are considered when selecting a candidate region, the candidate region having the best indicator (e.g., the highest increase of slope) is selected because that region (among the set of candidate regions) will best assist in determining the location of the peak in the similarity function $G(\alpha')$. According to one embodiment, the process 90 proceeds to act 330 (see FIG. 10) when all the candidate regions are processed.

Returning to step 321, as previously described, the similarity function $G^I(\alpha')$ is given by:

$$G^I(\alpha') = \sum_{i=1}^{I} G_i(\Delta\alpha) = G_0^I + 2b^{IT}\Delta\alpha + \Delta\alpha^T A^I \Delta\alpha \quad \text{Eq. 21}$$

where $$G_0^I = \sum_{i=1}^{I} G'_{0i}$$

$$b^I = \sum_{I} -b_i^T J_i$$

$$A^I = \sum_{I} J_i^T A_i J_i$$

Based on Equation 21, in one embodiment, the direction $v_{min}$ in the space $\alpha'$ in which the slope of the similarity function $G^I(\alpha')$ around its peak is the smallest can be determined in two primary steps. First, the matrix $A^I$ is diagonalized. In a version of this embodiment, the matrix $A^I$ is diagonalized according to the method described in William H. Press et al, Numerical Recipes in C: the art of scientific computing, Second Edition, Cambridge University Press, 1992, pp. 456-495. In one embodiment, the result is a set of eigenvectors $v_h$, each having a corresponding eigenvalue $\lambda_h$. Then, the eigenvector $v_{min}$ whose eigenvalue $\lambda_{min}$ is the closest to zero is selected. The eigenvector $v_{min}=[v_0, v_1, \ldots v_{N-1}]$ identifies the direction in the space $\alpha'$ of greatest uncertainty:

$$v_0\alpha'_0 + v_1\alpha'_1 + \ldots + v_{N-1}\alpha'_{N-1}=0 \quad \text{Eq. 22}$$

Figure 20:
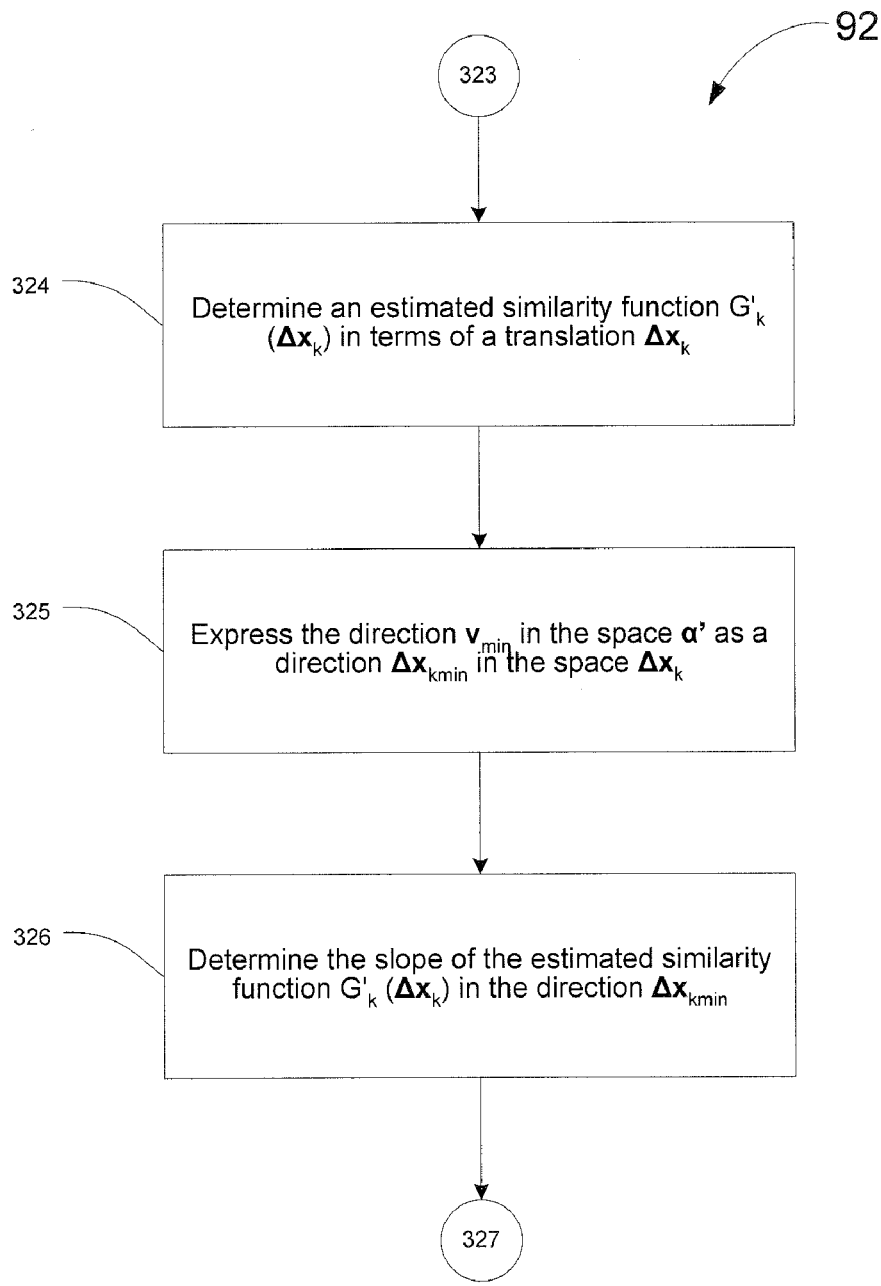
FIG. 20 illustrates a more detailed flow diagram of a portion of the process of FIG. 16 in accordance with a further embodiment of the invention.

FIG. 20 illustrates a process 92 for determining an effect of a selected region on the similarity function that may be included in various embodiments of the act 329 which was described with reference to FIG. 16. In accordance with one embodiment, at step 324, the estimated results of employing the candidate region $R_k$ to determine the similarity function $G_k(\Delta x_k)$ around its peak (i.e., according to act 330) is determined. The estimated similarity function is identified as $G'_k(\Delta x_k)$ (e.g., the estimated local similarity function). In accordance with one embodiment, the estimated similarity function $G'_k(\Delta x_k)$ is determined as follows:

A set of translations $\Delta x_{k1}$ is defined. Then, each translation $\Delta x_{k1}$ is selected, in turn.

For the selected translation $\Delta x_{k1}$, the similarity, determined inside the candidate region $R_k$, between the image $I_B$ and the image $I_B$ translated by the translation $\Delta x_{k1}$ is determined. This similarity is denoted $G'_{k1}(\Delta x_{k1})$. Preferably, the similarity measure used is the same as the one used at act 334, per example Normalized Grayscale Correlation (NGC). This measure is an estimate of the similarity measure $G_k$ between regions $R_k$ in images $I_B$ and $I_{AonB}$ ($\alpha$) at a translation $\Delta x_{k1}$ from a peak of the similarity function $G_k$. This estimate is reasonable since the process 80 expects to find a good match at act 338 between the region $R_k$ in image $I_B$ and a translated region of image $I_{AonB}(\alpha)$. This good match is estimated by the perfect match between the candidate region $R_k$ and itself.

Once all the translations $\Delta x_{k1}$ have been processed, the set of similarities $G'_{k1}(\Delta x_{k1})$ form a discrete version of the estimated similarity function $G'_k(\Delta x_k)$.

Finally, a continuous estimated similarity function $G'_k(\Delta x_k)$ is obtained by approximating the set of similarities $G'_{k1}(\Delta x_{k1})$ by a paraboloid around $\Delta x_k=0$, at which the peak occurs.

$$G'_k(\Delta x_k) = G'_{0k} + a_k \Delta x_k^2 + 2b_k \Delta x_k \Delta y_k + c_k \Delta y_k^2 \quad \text{Eq. 23}$$

or, in matrix form, $$G'_k(\Delta x_k) = G'_{0k} + \Delta x_k^T A'_k \Delta x_k \quad \text{Eq. 24}$$

where $$A'_k = \begin{pmatrix} a_k & b_k \\ b_k & c_k \end{pmatrix}$$

According to this embodiment, at act 325, the direction $v_{min}$ in the space $\alpha'$ for which the similarity function $G^I(\alpha')$ has the smallest slope is expressed as a direction $\Delta x_{min}$ in the space $\Delta x_k$:

$$\Delta x_{kmin}=J(x_{Bk},\alpha)v_{min}=J_k v_{min} \quad \text{Eq. 25}$$

where $J(x_{Bk}, \alpha)$, or simply $J_k$, denotes the value of the Jacobian vector $J(x, \alpha)$ at position $x_{Bk}$ of the warped image $I_{AonB}(\alpha)$ for the current value of the transformation vector $\alpha$.

At act 326, the slope of the estimated similarity function $G'_k(\Delta x_k)$ in the direction $\Delta x_{kmin}$ is determined in accordance with this embodiment. The slope may be given by:

$$\Delta G'_k = \sqrt{v_{min}^T J_k^T A'_k J_k v_{min}} \quad \text{Eq. 26}$$

The slope $\Delta G'_k$ can then be used as the indicator for candidate region $R_k$ concerning the effect of the region $R_k$ on the similarity function. Although the slope is chosen as an indicator in this example, other embodiments may employ a different indicator of the usefulness of the estimated similarity function $G'_k(\Delta x_k)$. For example, in one embodiment, the square of the slope in the direction $\Delta x_{k min}$ is used as the indicator.

Although embodiments described herein include one or more of the processes 60, 70, 80, 90 and 92, in some embodiments, these processes may be replaced by variations of these processes or by processes that are substantially different than the processes 60, 70, 80, 90 and 92.

In various embodiments, the process 60 may include the selection of regions in both images $I_A$ and $I_B$, rather than only the selection of regions in image $I_B$. In these embodiments, each region $R_i$ can be selected in either image $I_A$ or $I_B$, and is used to generate a similarity function $G_i$ with regard to the other image, respectively with $I_B$ or $I_A$. Further embodiments, can combine all of these similarity functions $G_i$ into a "global" similarity function $G(\alpha')$ that takes into account the matches between the images in both directions of the transformation.

Further, various embodiments of the process 70 can select regions at act 320 that include shapes that differ from the shape of the rectangular region described above. For example, one embodiment can select a shape that will remain in the defined domain $D_{B\_D}$ of the image $I_{AonB}$ when translated by translations $\Delta x_{ij}$ in act 334. Other embodiments can select regions that contain various types of features in an image, for example closed blobs, corners, etc.

Various embodiments of the invention can accomplish the acts described in processes 60, 70, 80 and 90 in a different order than those described previously. For example, one embodiment can calculate the estimated similarity functions $G'_k$ (e.g. the auto-correlation) for all candidates regions $R_k$ before starting the loop of process 60. The estimated similarity functions $G'_k$ can be reused in all iterations of the process 60. Also, in one embodiment, the Jacobian quantities J used at acts 340 and 329 can be calculated for all candidate regions $R_k$ before starting the loop of process 60 and be approximated as constant over the various iterations of the process 60.

As used herein, the term "similarity function" refers to any function that provides an indication of the similarity between images or one or more regions of images. Thus, in various embodiments of the invention can use a definition of the similarity function G that is smaller when measured on a good match between images or regions of images, for example the sum of absolute difference between pixels. In these embodiments, the process described will look for minimum peaks of the similarity functions $G_i(\alpha')$ and will find a minimum of the similarity function $G(\alpha')$ (e.g., the minimum of the global similarity function).

Other variations of the processes may be employed in various embodiments of the invention. For example, the act 200 of determining an image $I_{AonB}(\alpha)$ for the current value of the transformation vector $\alpha$ may be skipped in one embodiment, in particular, where the initial value of the transformation vector $\alpha$ is the identity transformation. One embodiment can also measure the similarity between regions $R_i$ in image $I_B$ and regions directly in the image $I_A$ by first transforming the shape of region $R_i$ to take into account the transformation as defined in the current value of the transformation vector $\alpha$.

Various embodiments may be employed with all types of image data and image acquisition systems. For example, the images may originate in a black and white format, a color format, as 2-D images, as 3-D images, as photographs or as video image data. Embodiments may be employed with image data in an analog format or digital format. Embodiments may be employed with various types of medical imaging systems, machine vision systems, security systems, video production systems, cartography systems, geological imaging systems, astronomical imaging systems and others that provide image data.

As described herein, various embodiments may provide an algorithm or set of algorithms which may be employed in an image processing system, i.e., which may be processed to align (e.g., register) two or more images or portions of images. According to one embodiment, the various algorithms described herein are included in an imaging processing system as one or more image processing software modules. For example, one or more of acts 100, 200, 300, 400, 500, and 600 of the process 60 may be included in one or more software modules that process image data. In a version of this embodiment, the act 300 may be provided in a plurality of software modules, for example, two or more software modules corresponding to one or more of acts 310, 320, 330, 340, 345, 350 and 360 of the process 70.

Similarly, various acts included in the processes 80, 90 and 92 may also be provided as one or more image processing software modules. In a further embodiment, these software modules are employed in an image processing system that receives a first image (e.g., the image A) and a second image (e.g., the image B) and determines a transformation between the two images. That is, the software modules may operate to process the image data associated with a plurality of images and determine a transformation (based on one or more transformation parameters) that optimally aligns the images.

Accordingly, various embodiments of the invention may provide the software modules as part of a computer readable medium such as a portable storage medium (e.g., a disk) or a "fixed" medium (e.g., a hard drive). According to a further embodiment, the computer readable medium is accessible via the Internet. In a version of this embodiment, one or more of the software modules may be downloaded to a remote user via an Internet connection.

In other embodiments, the processes described herein may be implemented fully or partially in hardware.

Any of the above-described embodiments, may be included in a computer system. The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor. Such a computer system generally includes a processor connected to one or more memory devices, such as a disk drive memory, a RAM memory, or other device for storing data. The memory is typically used for storing programs and data during operation of the computer system. Software, including programming code that implements embodiments of the present invention, is generally stored on a computer readable and/or writeable nonvolatile recording medium and then copied into memory wherein it is then executed by the processor. Such programming code may be written in any of a plurality of programming languages, for example, Java, Visual Basic, C, C#, or C++, Fortran, Pascal, Eiffel, Basic, COBAL, or any of a variety of combinations thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention.

Accordingly, the foregoing description and drawings are by way of example only.

What is claimed is:

1. A non-transitory computer readable medium encoded with a program for execution on a processor, the program, when executed on the processor performing a method of determining a transformation between a first image and a second image, the method comprising acts of:
   (a) for each region of a plurality of regions in the first image, each region of the plurality of regions comprising a plurality of pixels included in the first image, each of the plurality of pixels having at least one attribute,
      determining a corresponding region in the second image as a function of a transformation parameter, and
      determining a similarity function between the region in the first image and the corresponding region in the second image as a function of the transformation parameter;
   (b) determining a similarity function between the first image and the second image using the similarity function determined for each region of the plurality of regions; and
   (c) determining a value of the transformation parameter, wherein the value substantially optimizes the similarity function between the first image and the second image.

2. The non-transitory computer readable medium of claim 1, the method further comprising:
   employing a plurality of transformation parameters including the transformation parameter; and
   determining a value of each of the plurality of transformation parameters, respectively, wherein the respective values substantially optimize the similarity function between the first image and the second image.

3. The non-transitory computer readable medium of claim 2, wherein the plurality of transformation parameters include at least two parameters selected from a group consisting of a translation, a rotation, a scale change, a perspective change and a shearing.

4. The non-transitory computer readable medium of claim 2, wherein the act of determining the similarity function between the region in the first image and the corresponding region in the second image includes an act of approximating the similarity function between the region in the first image and the corresponding region in the second image as a function of a set of translations.

5. The non-transitory computer readable medium of claim 1, the method further comprising selecting the region in the first image for inclusion in the plurality of regions to reduce an uncertainty associated with the transformation parameter.

6. The non-transitory computer readable medium of claim 5, the method further comprising:
   locating a peak associated with the similarity function between the region in the first image and the corresponding region in the second image; and
   evaluating a candidate region to determine whether a slope in a vicinity of the peak increases if the candidate region is selected for inclusion in the plurality of regions.

7. The non-transitory computer readable medium of claim 1, wherein the act of determining the similarity function between the region in the first image and the corresponding region in the second image includes an act of approximating the similarity function between the region in the first image and the corresponding region in the second image as a function of a translation.

8. The non-transitory computer readable medium of claim 1, wherein the act of determining the similarity function between the region in the first image and the corresponding region in the second image includes an act of approximating the similarity function between the region in the first image and the corresponding region in the second image as a function of a set of translations.

9. A method of determining a transformation between a first image and a second image, the method comprising acts of:
   (a) for each region of a plurality of regions in the first image, each region of the plurality of regions comprising a plurality of pixels included in the first image, each of the plurality of pixels having at least one attribute,
      determining a corresponding region in the second image as a function of a transformation parameter, and
      determining a similarity function between the region in the first image and the corresponding region in the second image as a function of the transformation parameter;
   (b) determining a similarity function between the first image and the second image using the similarity function determined for each region of the plurality of regions; and
   (c) determining a value of the transformation parameter, wherein the value substantially optimizes the similarity function between the first image and the second image,
   wherein at least one of acts (a), (b) and (c) is performed using a computer.

10. The method of claim 9, further comprising:
    employing a plurality of transformation parameters including the transformation parameter; and
    determining a value of each of the plurality of transformation parameters, respectively, wherein the respective values substantially optimize the similarity function between the first image and the second image.

11. The method of claim 10, wherein the plurality of transformation parameters include at least two parameters selected from a group consisting of a translation, a rotation, a scale change, a perspective change and a shearing.

12. The method of claim 10, wherein the act of determining the similarity function between the region in the first image and the corresponding region in the second image includes an act of approximating the similarity function between the region in the first image and the corresponding region in the second image as a function of a set of translations.

13. The method of claim 9, further comprising selecting the region in the first image for inclusion in the plurality of regions to reduce an uncertainty associated with the transformation parameter.

14. The method of claim 13, further comprising:
    locating a peak associated with the similarity function between the region in the first image and the corresponding region in the second image; and
    evaluating a candidate region to determine whether a slope in a vicinity of the peak increases if the candidate region is selected for inclusion in the plurality of regions.

15. The method of claim 9, wherein the act of determining the similarity function between the region in the first image and the corresponding region in the second image includes an act of approximating the similarity function between the region in the first image and the corresponding region in the second image as a function of a translation.

16. The method of claim 9, wherein the act of determining the similarity function between the region in the first image and the corresponding region in the second image includes an act of approximating the similarity function between the region in the first image and the corresponding region in the second image as a function of a set of translations.

17. A method of determining a transformation between a first image and a second image, the method comprising acts of:
   (a) for each region of a plurality of regions in the first image, each region of the plurality of regions comprising a plurality of voxels included in the first image, each of the plurality of voxels having at least one attribute,
      determining a corresponding region in the second image as a function of a transformation parameter, and
      determining a similarity function between the region in the first image and the corresponding region in the second image as a function of the transformation parameter;
   (b) determining a similarity function between the first image and the second image using the similarity function determined for each region of the plurality of regions; and
   (c) determining a value of the transformation parameter, wherein the value substantially optimizes the similarity function between the first image and the second image,
   wherein at least one of acts (a), (b) and (c) is performed using a computer.

18. The method of claim 17, further comprising:
   employing a plurality of transformation parameters including the transformation parameter; and
   determining a value of each of the plurality of transformation parameters, respectively, wherein the respective values substantially optimize the similarity function between the first image and the second image.

19. The method of claim 18, wherein the plurality of transformation parameters include at least two parameters selected from a group consisting of a translation, a rotation, a scale change, a perspective change and a shearing.

20. The method of claim 18, wherein the act of determining the similarity function between the region in the first image and the corresponding region in the second image includes an act of approximating the similarity function between the region in the first image and the corresponding region in the second image as a function of a set of translations.

21. The method of claim 17, further comprising selecting the region in the first image for inclusion in the plurality of regions to reduce an uncertainty associated with the transformation parameter.

22. The method of claim 21, further comprising:
   locating a peak associated with the similarity function between the region in the first image and the corresponding region in the second image; and
   evaluating a candidate region to determine whether a slope in a vicinity of the peak increases if the candidate region is selected for inclusion in the plurality of regions.

23. The method of claim 17, wherein the act of determining the similarity function between the region in the first image and the corresponding region in the second image includes an act of approximating the similarity function between the region in the first image and the corresponding region in the second image as a function of a translation.

24. The method of claim 17, wherein the act of determining the similarity function between the region in the first image and the corresponding region in the second image includes an act of approximating the similarity function between the region in the first image and the corresponding region in the second image as a function of a set of translations.

* * * * *